United States Patent
Sun et al.

(10) Patent No.: US 12,302,164 B2
(45) Date of Patent: May 13, 2025

(54) UPLINK DATA TRANSMISSION CONTROL METHOD AND APPARATUS BASED ON UPLINK MAXIMUM BIT RATES

(71) Applicant: HUAWEI TECHNOLOGIES CO., LTD., Guangdong (CN)

(72) Inventors: Fei Sun, Shanghai (CN); Haiyan Luo, Shenzhen (CN); Mingzeng Dai, Shenzhen (CN); Jun Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 347 days.

(21) Appl. No.: 17/832,294

(22) Filed: Jun. 3, 2022

(65) Prior Publication Data

US 2022/0295334 A1 Sep. 15, 2022

Related U.S. Application Data

(63) Continuation of application No. PCT/CN2019/123761, filed on Dec. 6, 2019.

(51) Int. Cl.
*H04W 28/02* (2009.01)
*H04W 72/0453* (2023.01)
(Continued)

(52) U.S. Cl.
CPC ... *H04W 28/0257* (2013.01); *H04W 28/0268* (2013.01); *H04W 72/0453* (2013.01); *H04W 72/21* (2023.01); *H04W 72/56* (2023.01)

(58) Field of Classification Search
CPC ......... H04W 28/0257; H04W 28/0268; H04W 72/0453; H04W 72/21; H04W 72/56;
(Continued)

(56) References Cited

U.S. PATENT DOCUMENTS

2009/0225711 A1 9/2009 Sammour et al.
2012/0002541 A1 1/2012 Lee et al.
(Continued)

FOREIGN PATENT DOCUMENTS

CN 101459964 A 6/2009
CN 101902817 A 12/2010
(Continued)

OTHER PUBLICATIONS

3GPP TS 38.321 V15.7.0 (Sep. 2019), "3rd Generation Partnership Project; Technical Specification Group Radio Access Network; NR; Medium Access Control (MAC) protocol specification (Release 15)," Sep. 2019, 78 pages.
(Continued)

*Primary Examiner* — Justin T Van Roie
(74) *Attorney, Agent, or Firm* — Fish & Richardson P.C.

(57) ABSTRACT

This application provides example data transmission control methods and example apparatuses. One example method includes receiving, by a terminal device, first information from a network device, where the first information indicates an uplink maximum bit rate of each of at least one logical channel. The terminal device can then allocate an uplink resource to one or more logical channels in the at least one logical channel based on the uplink maximum bit rate.

18 Claims, 8 Drawing Sheets

(51) Int. Cl.
H04W 72/21 (2023.01)
H04W 72/56 (2023.01)

(58) Field of Classification Search
CPC ............. H04W 72/566; H04W 72/543; H04W 72/1268
See application file for complete search history.

(56) References Cited

U.S. PATENT DOCUMENTS

| | | | |
|---|---|---|---|
| 2017/0353972 | A1 | 12/2017 | Babaei et al. |
| 2020/0267753 | A1* | 8/2020 | Adjakple .............. H04W 72/54 |

FOREIGN PATENT DOCUMENTS

| | | |
|---|---|---|
| CN | 101933361 A | 12/2010 |
| CN | 102036390 B | 12/2014 |
| CN | 107295561 A | 10/2017 |
| WO | 2018075828 A1 | 4/2018 |

OTHER PUBLICATIONS

3GPP TS 38.331 V15.7.0 (Sep. 2019), "3rd Generation Partnership Project; Technical Specification Group Radio Access Network; NR; Radio Resource Control (RRC) protocol specification (Release 15)," Sep. 2019, 527 pages.
Nokia et al., "New WID Study on Enhancement of Network Slicing Phase 2," 3GPP TSG|WG-SA WG2 Meeting #134, S2-1908583, Sapporo, Japan, Jun. 24-28, 2019, 3 pages.
PCT International Search Report and Written Opinion issued in International Application No. PCT/CN2019/123761 on Aug. 26, 2020, 20 pages (with English translation).
Qualcomm Incorporated et al., "UE Handling of MBR Greater than GBR," 3GPP TSG-RAN WG2 #71, R2-104573, Madrid, Spain, Aug. 23-27, 2010, 4 pages.
Asustek, "Issue of Logical Channel Prioritization," 3GPP TSG RAN WG2 #61, R2-080886, Sorrento, Italy, Feb. 11-15, 2008, 2 pages.
Extended European Search Report issued in European Application No. 19954790.2 on Oct. 18, 2022, 12 pages.

* cited by examiner

UPLINK DATA TRANSMISSION CONTROL METHOD AND APPARATUS BASED ON UPLINK MAXIMUM BIT RATES

CROSS-REFERENCE TO RELATED APPLICATIONS

This application is a continuation of International Application No. PCT/CN2019/123761, filed on Dec. 6, 2019, the disclosure of which is hereby incorporated by reference in its entirety.

TECHNICAL FIELD

This application relates to the communication field, and more specifically, to an uplink data transmission control method and apparatus.

BACKGROUND

With development of mobile communication technologies, various new services and application scenarios continuously emerge, and requirements of these services on network functions, connection performance, security, and the like are greatly different.

How to control a terminal device to avoid network congestion is a problem worth considering.

SUMMARY

This application provides an uplink data transmission control method and apparatus, to reduce a network congestion risk.

According to a first aspect, an uplink data transmission control method is provided and includes: A terminal device receives first information from a network device, where the first information is used to indicate an uplink maximum bit rate of each of at least one logical channel. The terminal device allocates an uplink resource to all or a part of logical channels in the at least one logical channel based on the uplink maximum bit rate.

It should be understood that, an uplink maximum bit rate of a logical channel indicates an upper limit of a bit rate in uplink transmission on the logical channel. Optionally, the first information may be sent by the network device by using radio resource control (radio resource control, RRC) signaling, for example, a LogicalChannelConfig information element.

It should be understood that, the first information may carry the uplink maximum bit rate, or may carry a maximum amount of data that can be transmitted in an uplink within specific time. The maximum amount of data that can be transmitted in the uplink within the specific time and the uplink maximum bit rate may be mutually converted.

According to the uplink data transmission control method in this embodiment of this application, the network device indicates the uplink maximum bit rate of the at least one logical channel to the terminal device, so that the terminal device allocates the uplink resource to the logical channel based on a limit of the uplink maximum bit rate, to implement rate control on the logical channel when the terminal device performs uplink transmission. It should be understood that, for a logical channel, if the terminal device allocates a large quantity of uplink resources to the logical channel, an uplink bit rate of the logical channel is high; if the terminal device allocates a small quantity of uplink resources to the logical channel, an uplink bit rate of the logical channel is low. Therefore, the terminal device may allocate an uplink resource to the logical channel based on an uplink maximum bit rate of the logical channel, so that the uplink bit rate of the logical channel is controlled not to exceed the uplink maximum bit rate of the logical channel, to help reduce a network congestion risk.

In a possible implementation, the method in this embodiment of this application is mainly applicable to a logical channel corresponding to a data radio bearer (data radio bearer, DRB). That is, the at least one logical channel is the logical channel corresponding to the DRB.

With reference to the first aspect, in some implementations of the first aspect, the at least one logical channel corresponds to one network slice.

When the network device configures an uplink maximum bit rate of a logical channel for the terminal device, a sum of uplink maximum bit rates of all logical channels corresponding to one network slice may be enabled to be less than or equal to an uplink maximum bit rate of the network slice.

According to the uplink data transmission control method in this embodiment of this application, the network device configures the uplink maximum bit rate of the logical channel for the terminal device, to ensure that the sum of uplink maximum bit rates of all the logical channels corresponding to the network slice is less than or equal to the uplink maximum bit rate in the network slice. In this way, an uplink transmission rate of the terminal device in the network slice is controlled. This helps avoid a problem that the uplink transmission rate in the network slice is overloaded when the terminal device transmits uplink data, and further reduces a network congestion risk.

The at least one logical channel may correspond to the network slice. The network device may indicate the uplink maximum bit rate of the at least one logical channel to the terminal device based on the first information. It should be understood that, an uplink maximum bit rate of a logical channel is specific to a single logical channel, and indicates an upper limit of a bit rate in uplink transmission on the logical channel. An uplink maximum bit rate of a network slice is specific to a single network slice, and indicates an upper limit of bit rates in uplink transmission on all logical channels corresponding to the network slice.

With reference to the first aspect, in some implementations of the first aspect, the at least one logical channel corresponds to a protocol data unit PDU session.

When the network device configures an uplink maximum bit rate of a logical channel for the terminal device, a sum of uplink maximum bit rates of all logical channels corresponding to one PDU session may be enabled to be less than or equal to an uplink maximum bit rate of the PDU session. It should be understood that, an uplink maximum bit rate of a PDU session is specific to a single PDU session, and indicates an upper limit of bit rates in uplink transmission on all logical channels corresponding to the PDU session.

According to the uplink data transmission control method in this embodiment of this application, the network device configures the uplink maximum bit rate of the logical channel for the terminal device, to ensure that the sum of uplink maximum bit rates of all the logical channels corresponding to the PDU session is less than or equal to the uplink maximum bit rate of the PDU session. In this way, an uplink transmission rate of the terminal device in the PDU session is controlled. This helps avoid a problem that the uplink transmission rate in the PDU session is overloaded when the terminal device transmits uplink data, and reduces a network congestion risk.

With reference to the first aspect, in some implementations of the first aspect, that the terminal device allocates an uplink resource to all or a part of logical channels in the at least one logical channel based on the uplink maximum bit rate includes: The terminal device allocates the uplink resource to all or the part of logical channels in the at least one logical channel based on a prioritized bit rate of the at least one logical channel and the uplink maximum bit rate.

In this way, based on a prioritized bit rate of a logical channel and an uplink maximum bit rate, not only a problem that a logical channel with a low priority cannot always be served is avoided, but also an uplink transmission rate of the logical channel can be limited not to exceeding an upper limit of a transmission rate of the logical channel, to reduce a network congestion risk.

In a possible implementation, because an uplink maximum bit rate of a logical channel is an upper limit of a bit rate in uplink transmission on the logical channel, the uplink maximum bit rate of the logical channel may be greater than or equal to a prioritized bit rate of the logical channel.

With reference to the first aspect, in some implementations of the first aspect, that the terminal device allocates the uplink resource to all or the part of logical channels in the at least one logical channel based on a prioritized bit rate of the logical channel and the uplink maximum bit rate includes: The terminal device allocates the uplink resource to the at least one logical channel based on the prioritized bit rate of the logical channel. If there is a remaining uplink resource, and there is still data to be transmitted on a first logical channel in the at least one logical channel, the terminal device allocates the remaining uplink resource based on an uplink maximum bit rate of the first logical channel until any one of the following conditions is met: there is no data to be transmitted on the first logical channel, the remaining uplink resource is exhausted, or an uplink bit rate of the first logical channel reaches the uplink maximum bit rate of the first logical channel.

In an example, the terminal device may allocate an uplink resource to a logical channel according to a token bucket algorithm. To be specific, the terminal device may first perform the first-round allocation, and allocate the uplink resource to the logical channel based on a prioritized bit rate of the logical channel until any one of the following conditions is met: an uplink bit rate of the logical channel reaches a limit of the prioritized bit rate of the logical channel, or the uplink resource is exhausted. After the first-round allocation, the uplink bit rate of the logical channel is less than or equal to the prioritized bit rate of the logical channel from a perspective of time averaging. When the logical channel includes a plurality of logical channels, the terminal device may allocate the uplink resource to the plurality of logical channels based on prioritized bit rates of the plurality of logical channels and in descending order of priorities until any one of the following conditions is met: uplink bit rates of the plurality of logical channels all reach limits of the prioritized bit rates respectively, or the uplink resource is exhausted, so that the uplink bit rates of the plurality of logical channels are less than or equal to the prioritized bit rates respectively from a perspective of time averaging.

After the first-round allocation is completed, if there is still a remaining uplink resource, and there is still data to be transmitted on a first logical channel in the foregoing logical channels, the terminal device may perform the second-round allocation. It should be understood that, the first logical channel is a logical channel whose uplink bit rate is less than an uplink maximum bit rate of the logical channel in logical channels still with to-be-transmitted data. For all logical channels whose uplink bit rates have reached uplink maximum bit rates in the first-round allocation, the second-round allocation is no longer performed regardless of whether there is still data to be sent.

The terminal device may allocate the remaining uplink resource based on the uplink maximum bit rate of the first logical channel, namely, the UMBR of the first logical channel, until any one of the following conditions is met: there is no data to be transmitted on the first logical channel, or the remaining uplink resource is exhausted, so that the uplink bit rate of the first logical channel is less than or equal to the UMBR of the first logical channel from a perspective of time averaging. The first logical channel may be one logical channel, or may include a plurality of logical channels.

With reference to the first aspect, in some implementations of the first aspect, that the terminal device allocates the remaining uplink resource based on an uplink maximum bit rate of the first logical channel includes: If a sum of an uplink bit rate of a first service data unit SDU that is on the first logical channel and that is not multiplexed into a protocol data unit PDU and an uplink bit rate of a second SDU that is on the first logical channel and that has been multiplexed into the PDU is less than or equal to the uplink maximum bit rate of the first logical channel, the terminal device multiplexes the first SDU into the PDU.

In this way, when allocating an uplink resource, the terminal device may not segment an SDU as much as possible, so that an uplink transmission rate of a logical channel can be limited to not exceeding an upper limit of a transmission rate of the logical channel, to reduce a network congestion risk. In addition, some unnecessary procedures can be further simplified, and resource allocation efficiency of the terminal device can be improved.

With reference to the first aspect, in some implementations of the first aspect, that the terminal device allocates the remaining uplink resource based on an uplink maximum bit rate of the first logical channel includes: If a sum of an uplink bit rate of a first SDU that is on the first logical channel and that is not multiplexed into a PDU and an uplink bit rate of a second SDU that is on the first logical channel and that has been multiplexed into the PDU is greater than the uplink maximum bit rate of the first logical channel, the terminal device performs segmentation processing on the first SDU to obtain a first sub-SDU, and multiplexes the first sub-SDU into the PDU.

In this way, if an SDU is large and cannot meet a limit of the uplink maximum bit rate of the first logical channel, the terminal device may perform segmentation processing on the SDU to obtain a sub-SDU, so that the segmented sub-SDU can be multiplexed into the PDU when the uplink maximum bit rate of the first logical channel is met. In other words, for a large SDU, the terminal device may perform multiplexing through a segmentation operation, to increase an uplink transmission data amount on the first logical channel.

Further, during SDU segmentation, the terminal device may multiplex a larger SDU segment into the PDU as much as possible, to be specific, after a segmented sub-SDU is multiplexed into the PDU, an accumulated uplink bit rate of a third network slice is enabled to be equal to an uplink maximum bit rate of the third network slice as much as possible, to maximize data transmission of a logical channel.

With reference to the first aspect, in some implementations of the first aspect, the first logical channel includes at least two logical channels, and that the terminal device allocates the remaining uplink resource based on an uplink maximum bit rate of the first logical channel includes: The terminal device allocates the remaining uplink resource based on uplink maximum bit rates of the at least two logical channels and in descending order of priorities of the at least two logical channels until any one of the following conditions is met: there is no data to be transmitted on the at least two logical channels, the remaining uplink resource is exhausted, or uplink bit rates of the at least two logical channels reach limits of the uplink maximum bit rates of the at least two logical channels.

With reference to the first aspect, in some implementations of the first aspect, that the terminal device allocates the remaining uplink resource based on uplink maximum bit rates of the at least two logical channels and in descending order of priorities of the at least two logical channels includes: If a sum of an uplink bit rate of a third SDU that is on a second logical channel and that is not multiplexed into a PDU and an uplink bit rate of a fourth SDU that is on the second logical channel and that has been multiplexed into the PDU is less than or equal to an uplink maximum bit rate of the second logical channel, the terminal device multiplexes the third SDU into the PDU, where the second logical channel is a logical channel with a highest priority in the at least two logical channels.

In this way, when allocating an uplink resource, the terminal device may not segment an SDU as much as possible, so that an uplink transmission rate of a logical channel can be limited to not exceeding an upper limit of a transmission rate of the logical channel, to reduce a network congestion risk. In addition, some unnecessary procedures can be further simplified, and resource allocation efficiency of the terminal device can be improved.

With reference to the first aspect, in some implementations of the first aspect, that the terminal device allocates the remaining uplink resource based on uplink maximum bit rates of the at least two logical channels and in descending order of priorities of the at least two logical channels includes: If a sum of an uplink bit rate of a third SDU that is on a second logical channel and that is not multiplexed into a PDU and an uplink bit rate of a fourth SDU that is on the second logical channel and that has been multiplexed into the PDU is greater than an uplink maximum bit rate of the second logical channel, the terminal device performs segmentation processing on the third SDU to obtain a third sub-SDU, and multiplexes the third sub-SDU into the PDU, where the second logical channel is a logical channel with a highest priority in the at least two logical channels.

In this way, if an SDU is large and cannot meet a limit of the uplink maximum bit rate of the second logical channel, the terminal device may perform segmentation processing on the SDU to obtain a sub-SDU, so that the segmented sub-SDU can be multiplexed into the PDU when the uplink maximum bit rate of the second logical channel is met. In other words, for a large SDU, the terminal device may perform multiplexing through a segmentation operation, to increase an uplink transmission data amount on the second logical channel.

Further, during SDU segmentation, the terminal device may multiplex a larger SDU segment into the PDU as much as possible, to be specific, after a segmented sub-SDU is multiplexed into the PDU, an accumulated uplink bit rate of a third network slice is enabled to be equal to an uplink maximum bit rate of the third network slice as much as possible, to maximize data transmission of a logical channel.

After the terminal device allocates the uplink resource to the second logical channel according to the foregoing method, if there is still a remaining uplink resource, the terminal device may continue to allocate the uplink resource to a logical channel with a next priority, where the logical channel with the next priority is a logical channel that is with a priority next to that of the second logical channel and that is in the at least two logical channels.

According to a second aspect, another uplink data transmission control method is provided and includes: A network device determines first information, where the first information is used to indicate an uplink maximum bit rate of each of at least one logical channel. The network device sends the first information to a terminal device.

With reference to the second aspect, in some implementations of the second aspect, after that the network device sends the first information to a terminal device, the method further includes: The network device receives a protocol data unit PDU from the terminal device, where the PDU includes data from all or a part of logical channels in the at least one logical channel, and the data from all or the part of logical channels is multiplexed into the PDU based on the uplink maximum bit rate.

Optionally, after receiving the PDU of the terminal device, the network device may parse the PDU to obtain the data that is from the logical channel.

With reference to the second aspect, in some implementations of the second aspect, the at least one logical channel corresponds to one network slice.

With reference to the second aspect, in some implementations of the second aspect, the at least one logical channel corresponds to one PDU session.

According to a third aspect, another uplink data transmission control method is provided and includes: A terminal device determines a prioritized bit rate of a logical channel and an uplink maximum bit rate of a network slice, where the logical channel corresponds to the network slice. The terminal device allocates an uplink resource to the logical channel based on the prioritized bit rate of the logical channel and the uplink maximum bit rate of the network slice.

According to the uplink data transmission control method in this embodiment of this application, the terminal device allocates the uplink resource to the logical channel based on the uplink maximum bit rate of the network slice, to ensure that a sum of uplink bit rates of all logical channels corresponding to the network slice is less than or equal to the uplink maximum bit rate in the network slice. In this way, an uplink transmission rate of the terminal device in the network slice is controlled. This helps avoid a problem that the uplink transmission rate in the network slice is overloaded when the terminal device transmits uplink data, and reduces a network congestion risk.

The logical channel may include one or more logical channels, and the one or more logical channels correspond to one or more network slices. For example, it is assumed that there are three logical channels: a logical channel 1, a logical channel 2, and a logical channel 3. The three logical channels may correspond to two network slices. To be specific, the logical channel 1 and the logical channel 2 correspond to a network slice 1, and the logical channel 3 corresponds to a network slice 2. It should be understood that, an uplink maximum bit rate of a network slice is specific to a single network slice, and indicates an upper limit of bit rates in uplink transmission on all logical channels corresponding to the network slice.

With reference to the third aspect, in some implementations of the third aspect, that the terminal device allocates an uplink resource to the logical channel based on the prioritized bit rate of the logical channel and the uplink maximum bit rate of the network slice includes: The terminal device allocates the uplink resource to the logical channel based on the prioritized bit rate of the logical channel and the uplink maximum bit rate of the network slice until any one of the following conditions is met: an uplink bit rate of the logical channel reaches a limit of the prioritized bit rate of the logical channel, an uplink bit rate of the network slice exceeds the uplink maximum bit rate of the network slice, or the uplink resource is exhausted.

With reference to the third aspect, in some implementations of the third aspect, the logical channel includes at least two logical channels, and that the terminal device allocates an uplink resource to the logical channel based on the prioritized bit rate of the logical channel and the uplink maximum bit rate of the network slice includes: The terminal device allocates the uplink resource to the at least two logical channels in descending order of priorities of the at least two logical channels and based on prioritized bit rates of the at least two logical channels and the uplink maximum bit rate of the network slice until any one of the following conditions is met: uplink bit rates of the at least two logical channels both reach limits of the prioritized bit rates of the at least two logical channels, an uplink bit rate of the network slice corresponding to the at least two logical channels reaches a limit of an uplink bit rate of the network slice corresponding to the at least two logical channels, or the uplink resource is exhausted.

Specifically, the foregoing allocation process is the first-round allocation. To be specific, the terminal device may allocate the uplink resource to the logical channels according to a new token bucket algorithm proposed in this application, so that the uplink bit rates of the plurality of logical channels can be less than or equal to the prioritized bit rates respectively from a perspective of time averaging, and an uplink bit rate of each network slice can be less than or equal to a respective uplink maximum bit rate from a perspective of time averaging.

With reference to the third aspect, in some implementations of the third aspect, that the terminal device allocates the uplink resource to the at least two logical channels in descending order of priorities of the at least two logical channels and based on prioritized bit rates of the at least two logical channels and the uplink maximum bit rate of the network slice includes: When a quantity of tokens corresponding to a first logical channel in the at least two logical channels is greater than 0, the terminal device determines an accumulated uplink bit rate of a first network slice that corresponds to the first logical channel and that is in the network slice, after multiplexing a first service data unit SDU that is on the first logical channel in the at least two logical channels into a protocol data unit PDU, where the first logical channel is a logical channel with a highest priority in the at least two logical channels. If the accumulated uplink bit rate of the first network slice is less than or equal to an uplink maximum bit rate of the first network slice, the terminal device multiplexes the first SDU into the PDU.

With reference to the third aspect, in some implementations of the third aspect, that the terminal device allocates the uplink resource to the at least two logical channels in descending order of priorities of the at least two logical channels and based on prioritized bit rates of the at least two logical channels and the uplink maximum bit rate of the network slice includes: When a quantity of tokens corresponding to a first logical channel in the at least two logical channels is greater than 0, the terminal device determines an accumulated uplink bit rate of a first network slice that corresponds to the first logical channel and that is in the network slice, after multiplexing a first SDU that is on the first logical channel in the at least two logical channels into a PDU, where the first logical channel is a logical channel with a highest priority in the at least two logical channels. If the accumulated uplink bit rate of the first network slice is greater than an uplink maximum bit rate of the first network slice, and a quantity of tokens corresponding to a second logical channel in the at least two logical channels is greater than 0, after the terminal device determines to multiplex a second SDU that is on the second logical channel into the PDU, the terminal device obtains an accumulated uplink bit rate of a second network slice that corresponds to the second logical channel and that is in the network slice, where the second logical channel is a logical channel with a priority next to that of the first logical channel in the at least two logical channels. If the accumulated uplink bit rate of the second network slice is less than or equal to an uplink maximum bit rate of the second network slice, the terminal device multiplexes the second SDU into the PDU.

Specifically, in a process of the first-round allocation, the terminal device first allocates the uplink resource to the first logical channel with the highest priority, in descending order of the priorities of the at least two logical channels. If the accumulated uplink bit rate of the first network slice corresponding to the first logical channel exceeds a limit of the uplink maximum bit rate of the first network slice, the terminal device then allocates the uplink resource to the logical channel (namely, the second logical channel) with the next priority.

It should be understood that, the first network slice corresponding to the first logical channel and the second network slice corresponding to the second logical channel may be the same or may be different. In other words, the first logical channel and the second logical channel may correspond to a same network slice, or may correspond to different network slices. This is not limited in this embodiment of this application.

With reference to the third aspect, in some implementations of the third aspect, the accumulated uplink bit rate of the first network slice is determined based on a length of a sliding time window of the first network slice and an accumulated data amount of the first network slice in the sliding time window, where the accumulated data amount of the first network slice in the sliding time window is a sum of amounts of data transmitted on all logical channels of the first network slice in a first time period starting from a current moment, and a length of the first time period is the length of the sliding time window.

A limit on a rate is a concept from a perspective of average time. For a single TTI, limitation is strong, and flexibility is low. Therefore, an accumulated data amount of a network slice in a latest time period (which may include a plurality of TTIs) can be obtained by setting a sliding time window. This helps limit an uplink bit rate of the network slice, and improves calculation flexibility of the uplink bit rate of the network slice.

It should be understood that, a length of the sliding time window of the network slice may be obtained by the terminal device in advance. Specifically, the length of the sliding time window of the network slice may be configured by the network device for the terminal device, or may be defined in a protocol. This is not limited in this embodiment of this application.

With reference to the third aspect, in some implementations of the third aspect, the method further includes: The terminal device receives second information sent by the network device, where the second information is used to indicate a length of the sliding time window of the first network slice.

It should be understood that, lengths of sliding time windows corresponding to a plurality of network slices may be the same or may be different. If the sliding time windows corresponding to the plurality of network slices have a same length, the network device may indicate the length based on one piece of second information. If the lengths of the sliding time windows corresponding to the plurality of network slices are different, the network device may indicate identifiers of the network slices and the lengths of the sliding time windows of the network slices based on the second information, so that the lengths of the sliding time windows of the network slices correspond to the identifiers of the network slices respectively. For example, the second information may indicate a length 1, a length 2, and a length 3, and indicate that the length 1 corresponds to a network slice 1, the length 2 corresponds to a network slice 2, and the length 3 corresponds to a network slice 3.

With reference to the third aspect, in some implementations of the third aspect, after that the terminal device allocates an uplink resource to the logical channel based on the prioritized bit rate of the logical channel and the uplink maximum bit rate of the network slice, the method further includes: If there is a remaining uplink resource, and there is still data to be transmitted on a third logical channel in the logical channel, the terminal device allocates the remaining uplink resource based on an uplink maximum bit rate of a network slice corresponding to the third logical channel, until any one of the following conditions is met: there is no data to be transmitted on the third logical channel, the remaining uplink resource is exhausted, or an accumulated uplink bit rate of the network slice corresponding to the third logical channel reaches a limit of the uplink maximum bit rate of the network slice corresponding to the third logical channel.

After the first-round allocation is completed, if there is still the remaining uplink resource, and there is still the data to be transmitted on the third logical channel in the foregoing logical channel, the terminal device may perform the second-round allocation. It should be understood that, the third logical channel is a logical channel that is in logical channels still with to-be-transmitted data and that corresponds to a network slice whose accumulated uplink bit rate is less than an uplink maximum bit rate of the network slice. For all logical channels that correspond to a network slice whose accumulated uplink bit rate has reached an uplink maximum bit rate in the first-round allocation, the second-round allocation is no longer performed regardless of whether there is still data to be sent.

The terminal device may allocate the remaining uplink resource based on the uplink maximum bit rate of the network slice corresponding to the third logical channel, until any one of the following conditions is met: there is no data to be transmitted on the third logical channel, the remaining uplink resource is exhausted, or the accumulated uplink bit rate of the network slice corresponding to the third logical channel reaches the limit of the uplink maximum bit rate of the network slice corresponding to the third logical channel. The third logical channel may be one logical channel, or may include a plurality of logical channels. The network slice corresponding to the third logical channel may be one network slice, or may be a plurality of network slices.

With reference to the third aspect, in some implementations of the third aspect, that the terminal device allocates the remaining uplink resource based on an uplink maximum bit rate of a network slice corresponding to the third logical channel includes: After a third SDU that is on the third logical channel and that is not multiplexed into the PDU is multiplexed into the PDU, if an accumulated uplink bit rate of a third network slice that is in the network slice and that corresponds to the third logical channel is less than or equal to an uplink maximum bit rate of the third network slice, the terminal device multiplexes the third SDU into the PDU. Alternatively, after a third SDU is multiplexed into the PDU, if an accumulated uplink bit rate of a third network slice is greater than an uplink maximum bit rate of the third network slice, the terminal device performs segmentation processing on the third SDU to obtain a third sub-SDU, and multiplexes the third sub-SDU into the PDU.

In this way, when allocating an uplink resource, the terminal device may not segment an SDU as much as possible, and multiplex a larger SDU segment into the PDU as much as possible during SDU segmentation, so that data transmission on a logical channel is maximized.

With reference to the third aspect, in some implementations of the third aspect, the third logical channel includes at least two logical channels, and that the terminal device allocates the remaining uplink resource based on an uplink maximum bit rate of a network slice corresponding to the third logical channel includes: The terminal device allocates the remaining uplink resource based on the uplink maximum bit rate of the network slice corresponding to the third logical channel and in descending order of priorities of the third logical channel until any one of the following conditions is met: there is no data to be transmitted on the third logical channel, the remaining uplink resource is exhausted, or an accumulated uplink bit rate of the network slice corresponding to the third logical channel reaches a limit of the uplink maximum bit rate of the network slice corresponding to the third logical channel.

With reference to the third aspect, in some implementations of the third aspect, that the terminal device allocates the remaining uplink resource based on the uplink maximum bit rate of the network slice corresponding to the third logical channel and in descending order of priorities of the third logical channel includes: After a fourth SDU that is on a fourth logical channel and that is not multiplexed into a PDU is multiplexed into the PDU, if an accumulated uplink bit rate of a fourth network slice corresponding to the fourth logical channel is less than or equal to an uplink maximum bit rate of the fourth network slice, the terminal device multiplexes the fourth SDU into the PDU, where the fourth logical channel is a logical channel with a highest priority in the third logical channel.

With reference to the third aspect, in some implementations of the third aspect, that the terminal device allocates the remaining uplink resource based on the uplink maximum bit rate of the network slice corresponding to the third logical channel and in descending order of priorities of the third logical channel includes: After a fourth SDU that is on a fourth logical channel and that is not multiplexed into a PDU is multiplexed into the PDU, if an accumulated uplink bit rate of a fourth network slice corresponding to the fourth logical channel is greater than an uplink maximum bit rate of the fourth network slice, the terminal device performs segmentation processing on the fourth SDU to obtain a fourth sub-SDU, and multiplexes the fourth sub-SDU into the PDU, where the fourth logical channel is a logical channel with a highest priority in the third logical channel.

In this way, when allocating an uplink resource, the terminal device may not segment an SDU as much as possible, and multiplex a larger SDU segment into the PDU as much as possible during SDU segmentation, so that data transmission on a logical channel is maximized.

After the terminal device allocates the uplink resource to the fourth logical channel according to the foregoing method, if there is still a remaining uplink resource, the terminal device may continue to allocate the uplink resource to a logical channel with a next priority, where the logical channel with the next priority is a logical channel that is with a priority next to that of the fourth logical channel and that is in the at least two logical channels.

According to a fourth aspect, another uplink data transmission control method is provided and includes: A network device receives a protocol data unit PDU from a terminal device, where the PDU includes data from a logical channel, the logical channel corresponds to a network slice, and the data that is from the logical channel is multiplexed into the PDU based on a prioritized bit rate of the logical channel and an uplink maximum bit rate of the network slice. The network device parses the PDU to obtain the data that is from the logical channel.

With reference to the fourth aspect, in some implementations of the fourth aspect, before that a network device receives a protocol data unit PDU from a terminal device, the method further includes: The network device determines a length of a sliding time window of the network slice. The network device sends second information to the terminal device, where the second information is used to indicate the length of the sliding time window of the network slice.

With reference to the fourth aspect, in some implementations of the fourth aspect, the second information includes an identifier of the network slice and the length of the sliding time window of the network slice, and the length of the sliding time window of the network slice corresponds to the identifier of the network slice.

With reference to the fourth aspect, in some implementations of the fourth aspect, that the network device determines a length of a sliding time window of the network slice includes: The network device determines the length of the sliding time window of the network slice based on a type of the network slice.

Optionally, the network device may determine the length of the sliding time window of the network slice based on the type of the network slice. For example, for a network slice of a delay-sensitive service, a length of a sliding time window is short; for a network slice of a delay-insensitive service, a length of a sliding time window is long.

In this way, the network device may set different lengths of sliding time windows for different types of network slices, to adapt to different service features, and further flexibly adapt to a plurality of service scenarios.

According to a fifth aspect, an uplink data transmission control apparatus is provided, and configured to perform the method in any possible implementation of the foregoing aspects. Specifically, the apparatus includes units configured to perform the method in any possible implementation of the foregoing aspects.

According to a sixth aspect, another uplink data transmission control apparatus is provided and includes a processor. The processor is coupled to a memory, and may be configured to execute instructions that are in the memory, to implement the method in any one of the first aspect or the possible implementations of the first aspect, or the method according to any one of the third aspect or the possible implementations of the third aspect. In a possible implementation, the apparatus further includes the memory. In a possible implementation, the apparatus further includes a communication interface, and the processor is coupled to the communication interface.

In an implementation, the apparatus is a terminal device. When the apparatus is the terminal device, the communication interface may be a transceiver or an input/output interface.

In another implementation, the apparatus is a chip configured in a terminal device. When the apparatus is the chip configured in the terminal device, the communication interface may be an input/output interface.

According to a seventh aspect, another uplink data transmission control apparatus is provided and includes a processor. The processor is coupled to a memory, and may be configured to execute instructions that are in the memory, to implement the method in any one of the second aspect or the possible implementations of the second aspect, or the method according to any one of the fourth aspect or the possible implementations of the fourth aspect. In a possible implementation, the apparatus further includes the memory. In a possible implementation, the apparatus further includes a communication interface, and the processor is coupled to the communication interface.

In an implementation, the apparatus is a network device. When the apparatus is the network device, the communication interface may be a transceiver or an input/output interface.

In another implementation, the apparatus is a chip configured in a network device. When the apparatus is the chip configured in the network device, the communication interface may be an input/output interface.

According to an eighth aspect, a processor is provided, and includes an input circuit, an output circuit, and a processing circuit. The processing circuit is configured to receive a signal by using the input circuit, and transmit a signal by using the output circuit, so that the processor performs the method in any possible implementation of the foregoing aspects.

During specific implementation, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. A specific implementation of the processor and various circuits is not limited in this application.

According to a ninth aspect, a processing apparatus is provided, and includes a processor and a memory. The processor is configured to: read instructions stored in the memory, receive a signal through a receiver, and transmit a signal through a transmitter, to perform the method in any possible implementation of the foregoing aspects.

In a possible implementation, there are one or more processors, and there are one or more memories.

In a possible implementation, the memory may be integrated with the processor, or the memory and the processor are disposed separately.

In a specific implementation process, the memory may be a non-transitory (non-transitory) memory, for example, a read-only memory (read-only memory, ROM), and the memory and the processor may be integrated on a same chip, or may be disposed on different chips. A type of the memory and a manner of disposing the memory and the processor are not limited in this application.

It should be understood that, a related data exchange process such as sending of indication information may be a process of outputting the indication information from the processor, and receiving of capability information may be a process of receiving the input capability information by the processor. Specifically, data output by the processor may be output to a transmitter, and input data received by the processor may come from a receiver. The transmitter and the receiver may be collectively referred to as a transceiver.

The processing apparatus may be a chip. The processor may be implemented by hardware, or may be implemented by software. When implemented by the hardware, the processor may be a logic circuit, an integrated circuit, or the like. When implemented by the software, the processor may be a general-purpose processor. The general-purpose processor is implemented by reading software code stored in a memory. The memory may be integrated into the processor, may be located outside the processor, or may exist independently.

According to a tenth aspect, a computer program product is provided. The computer program product includes a computer program (which may also be referred to as code or instructions). When the computer program is run, a computer is enabled to perform the method in any possible implementation of the foregoing aspects.

According to an eleventh aspect, a computer-readable storage medium is provided. The computer-readable storage medium stores a computer program (which may also be referred to as code or instructions). When the computer program is run on a computer, the computer is enabled to perform the method in any possible implementation of the foregoing aspects.

DESCRIPTION OF EMBODIMENTS

The following describes the technical solutions of this application with reference to the accompanying drawings.

The technical solutions provided in this application may be applied to various communication systems, for example, a long term evolution (long term evolution, LTE) system, an LTE frequency division duplex (frequency division duplex, FDD) system, an LTE time division duplex (time division duplex, TDD) system, a 5th generation (5th generation, 5G) mobile communication system, a new radio (new radio, NR) system or another evolved communication system, a next-generation mobile communication system of a 5G communication system, and the like.

Figure 1:
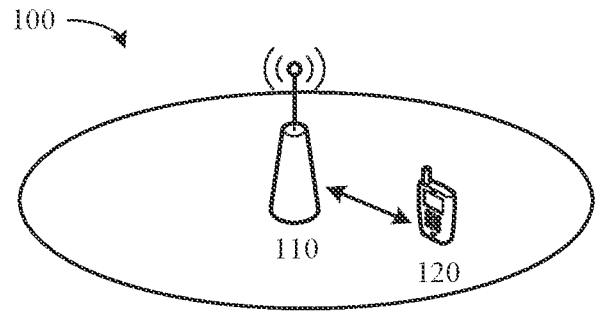
FIG. 1 is a schematic diagram of a communication system according to an embodiment of this application.

For ease of understanding the technical solutions provided in this application, a communication system applicable to embodiments of this application is first described in detail with reference to FIG. 1. FIG. 1 is a schematic diagram of a communication system 100 applicable to an uplink data transmission control method and apparatus according to an embodiment of this application. As shown in FIG. 1, the communication system 100 may include at least one network device, for example, the network device 110 shown in FIG. 1. The communication system 100 may further include at least one terminal device, for example, the terminal device 120 shown in FIG. 1. The network device 110 may communicate with the terminal device 120 through a radio link. A plurality of antennas may be configured for each communication device such as the network device 110 or the terminal device 120. The plurality of antennas may include at least one transmit antenna configured to send a signal and at least one receive antenna configured to receive a signal. In addition, the communication device further additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and signal receiving. Therefore, the network device 110 may communicate with the terminal device 120 by using a multi-antenna technology.

A terminal device in embodiments of this application may also be referred to as user equipment (user equipment, UE), a mobile station (mobile station, MS), a mobile terminal (mobile terminal, MT), an access terminal, a subscriber unit, a subscriber station, a mobile station, a mobile station, a remote station, a remote terminal, a mobile device, a user terminal, a terminal, a wireless communication device, a user agent, a user apparatus, or the like.

The terminal device may be a device that provides a user with voice/data connectivity, for example, a handheld device or a vehicle-mounted device having a wireless connection function. Currently, examples of some terminal devices include a mobile phone (mobile phone), a tablet computer, a notebook computer, a palmtop computer, a mobile Internet device (mobile internet device, MID), a wearable device, a virtual reality (virtual reality, VR) device, an augmented reality (augmented reality, AR) device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device or a computing device having a wireless communication function or another processing device connected to a wireless modem, a vehicle-mounted device, a wearable device, a terminal device in a 5G network, a terminal device in a future evolved public land mobile network (public land mobile network, PLMN), or the like. This is not limited in this application.

As an example instead of a limitation, in this application, the terminal device may be a terminal device in an Internet of Things (internet of things, IoT) system. The Internet of Things is an important part in development of future information technologies. A main technical feature of the Internet of Things is to connect an object to a network by using a communication technology, to implement an intelligent network for human-machine interconnection and thing-thing interconnection. For example, the terminal device in this embodiment of this application may be the wearable device. The wearable device may also be referred to as a wearable intelligent device, and is a general term for wearable devices, such as glasses, gloves, watches, clothes, and shoes, that are developed by applying wearable technologies to intelligent designs of daily wear. The wearable device is a portable device that is directly worn on a body or integrated into clothes or an accessory of a user. The wearable device is not only a hardware device, but also implements a powerful function through software support, data exchange, and cloud interaction. In a board sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

As an example instead of a limitation, in embodiments of this application, the terminal device may alternatively be a terminal device in machine type communication (machine type communication, MTC). In addition, the terminal device may alternatively be a vehicle-mounted module, a vehicle-mounted assembly, a vehicle-mounted component, a vehicle-mounted chip, a vehicle-mounted unit, or the like that a vehicle is equipped with as one or more components or units, the vehicle may implement the method provided in this application by using the built-in vehicle-mounted module, vehicle-mounted assembly, vehicle-mounted component, vehicle-mounted chip, vehicle-mounted unit, or the like. Therefore, embodiments of this application may also be applied to the Internet of Vehicles, for example, a vehicle to everything (vehicle to everything, V2X) technology, a long term evolution-vehicle (long term evolution-vehicle, LTE-V) technology, or a vehicle-to-vehicle (vehicle-to-vehicle, V2V) technology.

A network device in this application may be a device communicating with a terminal device. The network device may also be referred to as an access network device or a radio access network device, and may be a transmission reception point (transmission reception point, TRP), may be an evolved NodeB (evolved NodeB, eNB or eNodeB) in an LTE system, may be a home NodeB (for example, a home evolved NodeB, or a home NodeB HNB), a baseband unit (baseband unit, BBU), or may be a radio controller in a cloud radio access network (cloud radio access network, CRAN) scenario. Alternatively, the network device may be a relay station, an access point, a vehicle-mounted device, a wearable device, a network device in a 5G network, a network device in a future evolved PLMN network, or the like, may be an access point (access point, AP) in a WLAN, or may be a gNB in an NR system. Alternatively, the network device may be a city base station, a micro base station, a pico cell, a femto cell, or the like. This is not limited in this application.

In a network structure, the network device may include a centralized unit (centralized unit, CU) node, a distributed unit (distributed unit, DU) node, a radio access network (radio access network, RAN) device including a CU node and a DU node, or a RAN device including a CU-control plane node (CU-CP node), a CU-user plane node (CU-UP node), and a DU node.

The network device provides a service for a cell. The terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell (small cell). The small cell herein may include a metro cell (metro cell), a micro cell (micro cell), a pico cell (pico cell), a femto cell (femto cell), and the like. These small cells have characteristics of small coverage and a low transmit power, and are applicable to providing a high-rate data transmission service.

It should be understood that, FIG. 1 is merely a schematic diagram, and the communication system 100 may further include another device that is not shown. In addition, a quantity of terminal devices and a quantity of network devices included in the communication system 100 are not limited in this embodiment of this application.

In embodiments of this application, the terminal device or the network device includes a hardware layer, an operating system layer running on the hardware layer, and an application layer running on the operating system layer. The hardware layer includes hardware such as a central processing unit (central processing unit, CPU), a memory management unit (memory management unit, MMU), and a memory (also referred to as a main memory). The operating system may be any one or more computer operating systems that implement service processing through a process (process), for example, a Linux operating system, a Unix operating system, an Android operating system, an iOS operating system, or a Windows operating system. The application layer includes applications such as a browser, a contact list, word processing software, and instant messaging software. In addition, a specific structure of an execution body of the method provided in this application is not specifically limited in this application, provided that a program that records code of the method provided in this application can be run to perform communication according to the method provided in embodiments of this application. For example, the method provided in embodiments of this application may be performed by the terminal device or the network device, or a functional module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable storage medium may include but is not limited to a magnetic storage device (for example, a hard disk, a floppy disk, or a magnetic tape), an optical disc (for example, a compact disc (compact disc, CD) or a digital versatile disc (digital versatile disc, DVD)), or a smart card and a flash memory device (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

To facilitate understanding of embodiments of this application, the following first briefly describes terms used in this application.

1. Network Slice (Network Slice, NS)

A network slice is an end-to-end logical dedicated network that provides a specific network capability. Through flexible allocation of network resources and on-demand networking, a plurality of isolated logical subnets with different characteristics may be virtualized on a same physical infrastructure to provide services for users. The logical subnet is referred to as the network slice. The network slice may be used by an operator. Based on a service level agreement (service level agreement, SLA) signed by a customer, the network slice provides mutually isolated network services with customizable functions for different vertical industries, different customers, and different services. Different network slices may be identified and distinguished by using single network slice selection assistance information (single network slice selection assistance information, S-NSSAI).

Figure 2:
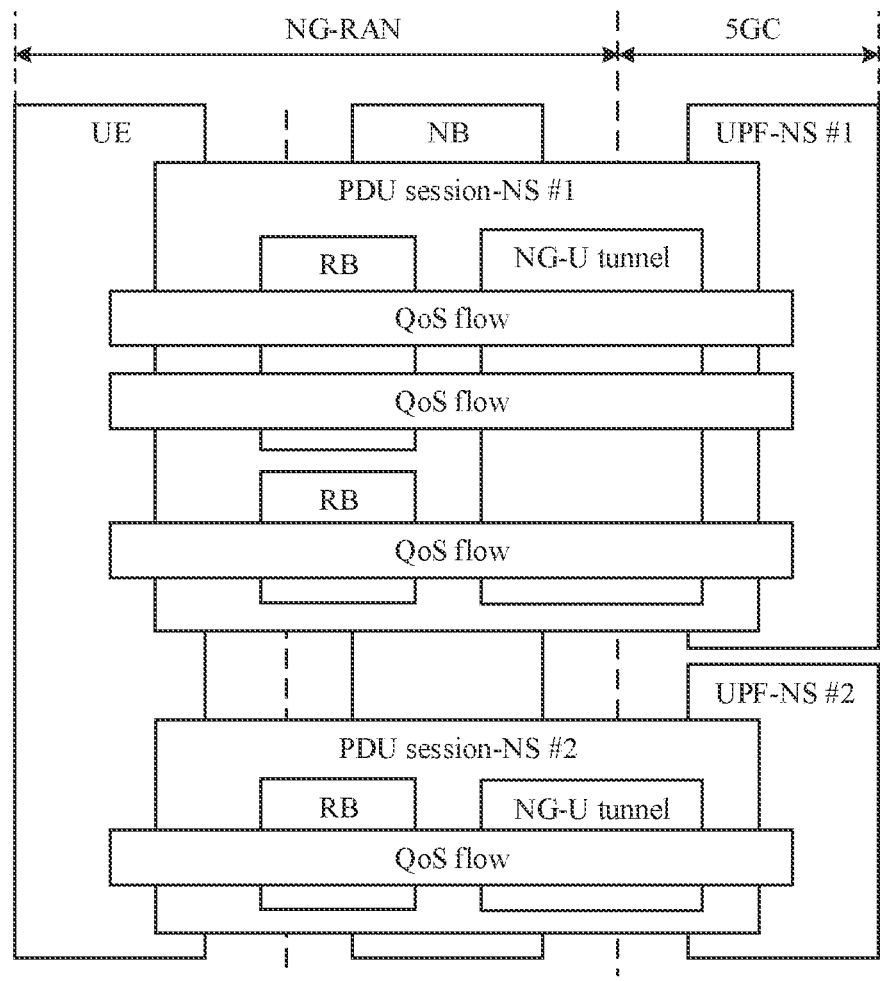
FIG. 2 is a schematic diagram of a correspondence between a network slice and a PDU session.

The network slice may include a wireless network slice, a transport network slice, and a core subnet slice. A terminal device may establish a connection to a network slice by using a PDU session (PDU session). Traffic (traffic) of different network slices is managed by different PDU sessions. One PDU session belongs to one network slice, there are a plurality of PDU sessions in a single network slice, and PDU sessions in different network slices are isolated from each other. In addition, different radio bearers (radio bearers, RBs) that are isolated from each other may be configured for different network slices. One RB may correspond to one logical channel (logical channel, LCH), or may correspond to a plurality of LCHs. Similar to the PDU session, diversity of quality of service (quality of service, QoS) is also supported inside a network slice. In conclusion, one network slice may include one or more PDU sessions, and one PDU session may include one or more RBs and one or more QoS flows. FIG. 2 is a schematic diagram of a correspondence between a network slice and a PDU session. In FIG. 2, UE and an NB belong to a next generation radio access network (next generation radio access network, NG-RAN). The NB may include an eNB and a gNB, and may further include another NB. This is not limited herein. A user plane function (user plane function, UPF) network element on the right side of the NB belongs to a 5G core (5G core, 5GC) network. There is one PDU session in a network slice 1 (NS #1). The PDU session includes two RBs and one NG-U tunnel, and the NG-U tunnel includes three QoS flows. There is one PDU session in a network slice 2 (NS #2). The PDU session includes one RB and one NG-U tunnel, and the NG-U tunnel includes one QoS flow. The NG-U tunnel is a user plane tunnel (of an N3 interface) between a gNB and the UPF, and may include one or more QoS flows. One PDU session corresponds to one NG-U tunnel.

2. Service Data Unit SDU, Protocol Data Unit PDU, and Media Access Control (Media Access Control, MAC) Layer Multiplexing (Multiplexing)

A service data unit (service data unit, SDU) is also referred to as a service data unit, and is a data set of a user service at a specified layer. After being sent to a lower layer, the service data unit is encapsulated at the lower layer in a protocol data unit (protocol data unit, PDU) and the PDU is sent. For each layer, an information unit from a higher layer is referred to as an SDU at the layer, and an information unit processed at the layer and sent to a lower layer is referred to as a PDU at the layer. An SDU is an information unit transmitted from a higher protocol layer to a lower protocol layer. For example, an SDU at the $N^{th}$ layer is in one-to-one correspondence with a PDU at an upper layer of the $N^{th}$ layer.

Specifically, the SDU refers to an amount of information that is received from an entity at the $(N+1)^{th}$ layer, that is not processed by an entity at the $N^{th}$ layer, and whose identifier is remained.

The PDU is a specific data unit at an N protocol layer, and includes protocol control information of the N protocol layer and possible user data at the N protocol layer.

A transmit end may multiplex data that is on a plurality of logical channels into one transport channel (transport channel, TCH), that is, multiplex a plurality of MAC SDUs into one MAC PDU, through a multiplexing function of a MAC layer, and send the transport channel through a physical layer.

Multiplexing/demultiplexing of MAC SDUs belonging to one or different logical channels into/from transport blocks (TB) delivered to/from the physical layer on transport channels.

For ease of description, that a transmit end multiplexes a plurality of MAC SDUs into one MAC PDU through a MAC layer is referred to as "MAC layer multiplexing" or "multiplexing SDUs into a PDU" for short as follows. It should be understood that, a terminal device can send only one MAC PDU within one transmission time interval (transmission time interval, TTI) (without considering spatial multiplexing and carrier aggregation). Therefore, MAC SDUs of a plurality of logical channels need to be multiplexed into a same MAC PDU. This is a meaning of MAC layer multiplexing.

When there is data to be sent on all of a plurality of logical channels, and a total data amount of the plurality of logical channels exceeds a transmission capability within a current TTI, a problem of which logical channel should be preferably used for sending occurs, and priorities of the logical channels need to be determined. During downlink transmission, a network device may determine a priority of a logical channel based on a type of the logical channel and a QoS parameter of a bearer corresponding to the logical channel. MAC layer multiplexing is more likely to be performed on a logical channel with a higher priority, and therefore the logical channel may obtain more transmission opportunities, which means a higher transmission rate or a lower transmission delay. During uplink transmission, the network device may allocate an uplink resource based on a request of the terminal device and an amount of to-be-sent data. However, the uplink resource allocated by the network device is specific to the terminal device, and is not specific to a logical channel. The following mainly describes a case of uplink transmission in detail. Because an SDU is from a logical channel, for uplink transmission. "MAC layer multiplexing" may be understood as that "the terminal device allocates an uplink resource to a logical channel".

When the terminal device needs to send uplink data, the terminal device may notify, by using a buffer status report (buffer status report, BSR), the network device of an amount of data that is in an uplink buffer (buffer) of the terminal device and that needs to be sent, so that the network device configures an uplink resource for the terminal device. To reduce a quantity of information bits transmitted on an air interface, the protocol specifies that each logical channel group (logical channel group, LCG) corresponds to a value of a BSR, and each logical channel group includes one or more logical channels. LCG division varies with implementations of different vendors. Generally, services carried on logical channels in a same LCG have similar QoS requirements. Therefore, a single LCG may include logical channels in different network slices. Consequently, the network device cannot obtain data amount information of each network slice based on the BSR. After the terminal device reports the BSR, the network device may allocate an uplink resource to the terminal device based on the BSR, but does not specify logical channels by which the allocated uplink resource is to be used. After obtaining the uplink resource, the terminal device may multiplex MAC SDUs from all logical channels into a MAC PDU based on priorities of the logical channels, and then send the MAC PDU through a physical layer.

To avoid a problem that a logical channel with a low priority cannot always be served, the network device sets a prioritized bit rate (prioritized bit rate, PBR) in a unit of kB/s for each of logical channels of the terminal device, to ensure that the terminal device limits a transmission rate of a logical channel with a high priority in the logical channels, so that a logical channel with a low priority in the logical channels and with to-be-transmitted data is served. In other words, if a data transmission rate of a logical channel with a high priority is greater than or equal to a PBR of the logical channel, even if there is still data to be sent on the logical channel with the high priority, the terminal device allocates an uplink resource to a logical channel with a low priority and whose data transmission rate does not reach the PBR. In a possible implementation, the terminal device may allocate an uplink resource according to a token bucket (token bucket) algorithm.

3. Token Bucket (Token Bucket) Algorithm

The token bucket algorithm is a common rate limit method, and can be compared to an operation process of a bucket (bucket) including tokens. A basic idea of the algorithm is to determine, depending on whether there is a token in a token bucket and based on a quantity of tokens, whether to send data that is on a logical channel, and control an amount of data that is on the logical channel and that is multiplexed into a MAC PDU.

A network device may configure the following parameters for each logical channel by sending configuration information (for example, a LogicalChannelConfig information element) to a terminal device:

a priority (priority);
a prioritized bit rate (PBR); and
bucket size duration (bucket Size Duration, BSD).

The foregoing priority may also be referred to as a logical channel priority. The logical channel priority determines a sequence of uplink resource allocation (that is, a multiplexing sequence) when multiplexing is performed on a plurality of logical channels. The PBR indicates a quantity of bytes injected into the bucket per second. The BSD indicates a depth of the bucket and is in a unit of millisecond ms. Therefore, a maximum capacity of the token bucket is PBR*BSD. This limits a total amount of data that can be buffered in each logical channel. However, this does not represent an uplink maximum bit rate of the logical channel. It should be understood that, the configuration information is specific to a logical channel. To be specific, one logical channel corresponds to one piece of configuration information, each logical channel has a priority, a PBR, and BSD of the logical channel, and each logical channel has a token bucket of the logical channel.

The terminal device receives the configuration information sent by the network device, determines a priority, a PBR, and BSD of each logical channel, and allocates an uplink resource according to a token bucket algorithm in descending order of priorities. After the terminal device allocates the uplink resource according to the token bucket algorithm, if there is a remaining uplink resource and there is to-be-transmitted data on a logical channel, the terminal device may further perform uplink resource reallocation. Therefore, in this application, the token bucket algorithm is also referred to as a first-round allocation algorithm, the reallocation after the token bucket algorithm is referred to as a second-round allocation algorithm.

First-round allocation algorithm: The terminal device may allocate an uplink resource to logical channels based on prioritized bit rates of the logical channels and in descending order of priorities until any one of the following conditions is met: the uplink resource is allocated to all the logical channels, or the uplink resource is exhausted.

Figure 3:
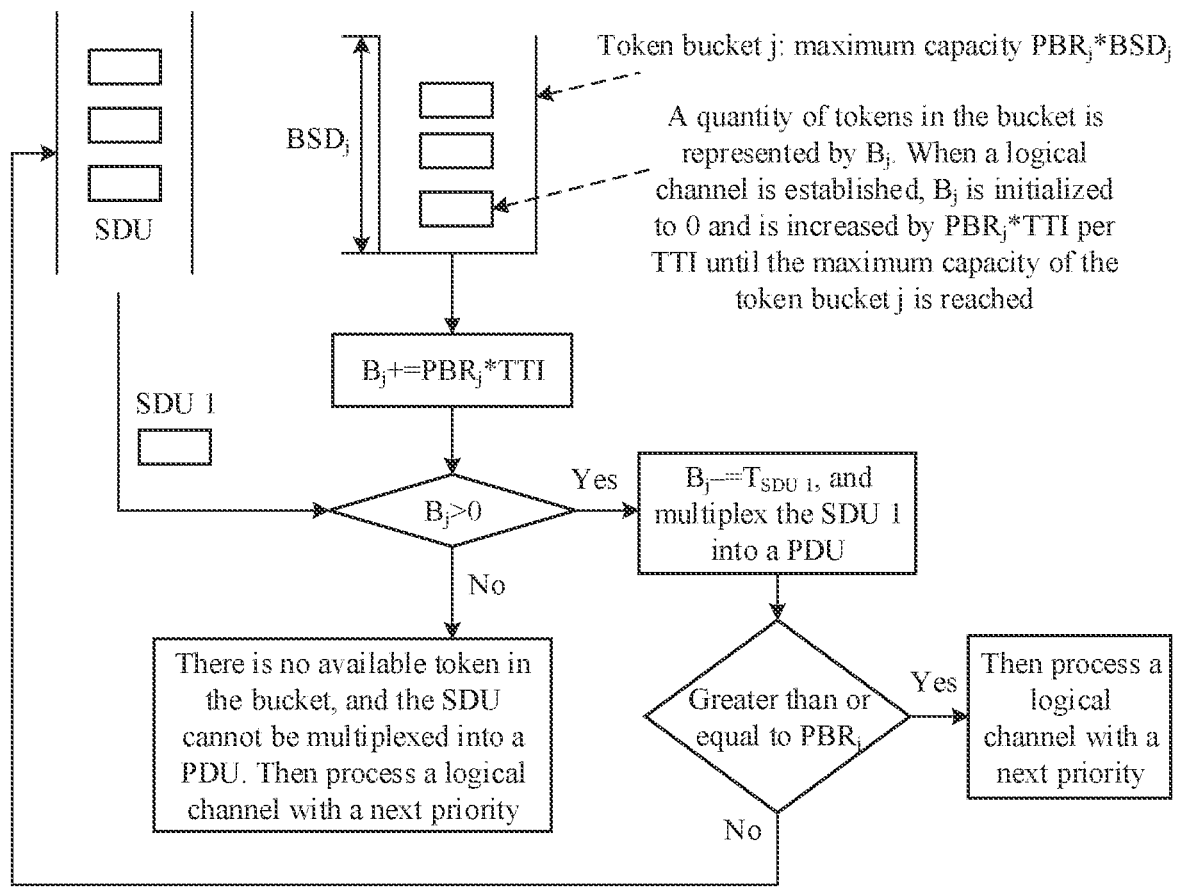
FIG. 3 is a schematic flowchart of a token bucket algorithm.

FIG. 3 is a schematic flowchart of a token bucket algorithm (namely, a first-round allocation algorithm). The following describes the token bucket algorithm in detail with reference to FIG. 3.

It is assumed that there are M logical channels in total, M is an integer greater than or equal to 1, and each of the M logical channels corresponds to one token bucket, in other words, each logical channel has a priority, a PBR, and BSD of the logical channel. A logical channel j is used as an example, where $j \in \{1, 2, \ldots, M\}$. The logical channel j corresponds to a token bucket j. The terminal device may maintain a variable $B_j$ for the logical channel j. The variable indicates a quantity of currently available tokens in the token bucket j, and each token corresponds to 1-byte data. $B_j$ is initialized to 0 when the logical channel j is established, and $PBR_j$*TTI is increased per TTI (to be specific, assuming that $PBR_j$ is 8 kBps, 8 kBps*1 ms=8-byte tokens are injected into the token bucket per TTI). A value of $B_j$ cannot exceed a maximum capacity $PBR_j$*$BSD_j$ of the token bucket (assuming that $PBR_j$ is 8 kBps, and $BSD_j$=500 ms, the maximum capacity is 8 kBps*500 ms=4 k bytes). When uplink data needs to be transmitted, the terminal device may perform a token bucket algorithm to allocate an uplink resource, in other words, multiplex SDUs into a PDU.

Specifically, the terminal device may perform the following steps on logical channels in descending order of priorities. The following uses the logical channel j as an example for description.

Step 1: Obtain an SDU 1 in the logical channel j, and determine whether $B_j$ is greater than 0.

Step 2: If $B_j$ is less than 0, it indicates that there is no available token in the token bucket. Consequently, the SDU 1 cannot be multiplexed into the PDU, and a procedure of processing the logical channel j by the terminal device ends. Then, a logical channel with a next priority is processed.

Step 3: If $B_j$ is greater than 0, the terminal device multiplexes the SDU 1 into the PDU, and performs $B_j -= T_{SDU\ 1}$, where the $T_{SDU\ 1}$ indicates a data amount of the SDU 1, and $B_j -= T_{SDU\ 1}$ indicates that the value of $B_j$ is updated to a value of $B_j - T_{SDU\ 1}$.

Step 4: After step 3, the terminal device determines whether an uplink bit rate of the logical channel j is greater than or equal to $PBR_j$.

Step 5: If the uplink bit rate of the logical channel j is less than $PBR_j$, the terminal device continues to obtain an SDU that is on the logical channel j.

Step 6: If the uplink bit rate of the logical channel j is greater than or equal to $PBR_j$, a procedure of processing the logical channel j by the terminal device ends. Then a next logical channel is processed.

It should be understood that, in the first-round allocation algorithm, a minimum multiplexing unit is an SDU. After the terminal device multiplexes an SDU into the PDU, if an uplink bit rate of a current logical channel is greater than or equal to a PBR of the logical channel, the terminal device processes a logical channel with a next priority; if an uplink bit rate of a current logical channel is less than a PBR of the logical channel, the terminal device may continue to process a next SDU that is on the logical channel. Therefore, in a single TTI, an uplink bit rate of a logical channel may be greater than a PBR of the logical channel, equal to the PBR of the logical channel, or less than the PBR of the logical channel. This is allowed in the first-round allocation algorithm.

It should be noted that the token bucket algorithm allows $B_j$ to be less than 0. To be specific, when $B_j>0$ and $B_j - T_{SDU}<0$ before an SDU that is on the logical channel j is multiplexed into the PDU, the SDU is not placed in a queue, and is multiplexed into the PDU by obtaining sufficient tokens in a "loan" manner (in this case, after $T_{SDU}$ is subtracted from $B_j$, a value of $B_j$ is less than 0). The logical channel j can perform subsequent data transmission only after the borrowed tokens are repaid ($B_j$ is increased by $PBR_j*TTI$ per TTI until $B_j>0$). In a time period of "loan repayment" (namely, a time period from $B_j<0$ to $B_j>0$), the uplink bit rate of the logical channel does not exceed the PBR of the logical channel. For example, if a data amount of to-be-transmitted data on the logical channel j is $T_{SDU}=500$ bytes, $PBR_j$ configured by the network device for the logical channel j is 100 kBps. In a current TTI, a quantity of tokens in the token bucket of the logical channel j is $B_j=100$. If the uplink resource is sufficient, the token bucket algorithm allows the terminal device to multiplex the SDU into the PDU. After multiplexing, a quantity of tokens of the logical channel j changes to $B_j=100-500=-400$, and the logical channel j is suspended in next four TTIs (100 kBps*4 ms=400 bytes in a loan repayment process), in other words, the terminal device cannot transmit data that is on the logical channel j. Finally, in a process with duration of five TTIs, 500-byte data is sent on the logical channel j in total, and an average uplink bit rate is 500 bytes/5 ms=100 kBps, which is consistent with $PBR_j$ configured by the network device.

In addition, for a logical channel with a low priority, where the logical channel j is used as an example, if the uplink resource is limited, the logical channel j may not be served in previous several TTIs, but a quantity of tokens in a token bucket of the logical channel j continuously increases with TTIs (but does not exceed $PBR_j*BSD_j$). For example, it is assumed that a data amount of to-be-transmitted data on a logical channel j with a low priority is 300 bytes, $PBR_j$ of the logical channel j is 100 kBps, and $BSD_j$ of the logical channel j is 3 ms. In first two TTIs, the logical channel j is not served because the uplink resource is limited. In the third TTI, the uplink resource is sufficient. In this case, a quantity of tokens in the token bucket of the logical channel j increases to $B_j=100$ kBps*3 ms=300, all to-be-transmitted data on the logical channel j can be sent. In this way, in a process with duration of three TTIs, 300-byte data is transmitted on the logical channel j in total, and an average uplink bit rate is 300 bytes/3 ms=100 kBps, which is consistent with $PBR_j$ configured by the network device.

Second-round allocation algorithm: If there is still a remaining uplink resource after the first-round allocation, and there is a logical channel with to-be-transmitted data, the terminal device may directly allocate the remaining uplink resource in descending order of priorities of logical channels with to-be-transmitted data until any one of the following conditions is met: there is no data to be transmitted on all the logical channels, or the remaining uplink resource is exhausted.

For example, after the first-round allocation, there is the remaining uplink resource, and there are still N logical channels with to-be-transmitted data in the M logical channels, where N is a positive integer less than or equal to M. The terminal device may allocate the remaining uplink resource in descending order of priorities of the N logical channels. A logical channel with a low priority can be served only when the uplink resource is allocated to data on a logical channel with a high priority and the uplink resource is not exhausted. In other words, in the second-round allocation, the terminal device maximizes data transmission on the logical channel with the high priority.

It should be understood that, in a process of the second-round allocation, the terminal device may comply with the following principles:

(1) if an entire SDU can be filled in a remaining PDU, the terminal device should not segment the SDU;

(2) if the terminal device segments an SDU that is on a logical channel, the terminal device should fill in a maximum segment as much as possible based on a size of a remaining resource and a PBR of the logical channel, that is, the terminal device should maximize data transmission;

(3) if a radio bearer or a logical channel is suspended (a quantity of tokens is less than 0), the terminal device should not transmit data that is on the logical channel corresponding to the radio bearer:

(4) if PBRs of all logical channels are set to 0 kBps, the terminal device allocates the uplink resource in descending order of priorities strictly, in other words, in this case, the terminal device meets transmission of data with a higher priority to a greatest extent; and (5) if a PBR of a logical channel is configured to infinity (infinity), for example, a PBR of a logical channel corresponding to a signaling radio bearer (signaling radio bearer, SRB), only after there is no data to be transmitted on the logical channel, the terminal device considers another logical channel whose priority is lower than that of the logical channel.

Figure 4:
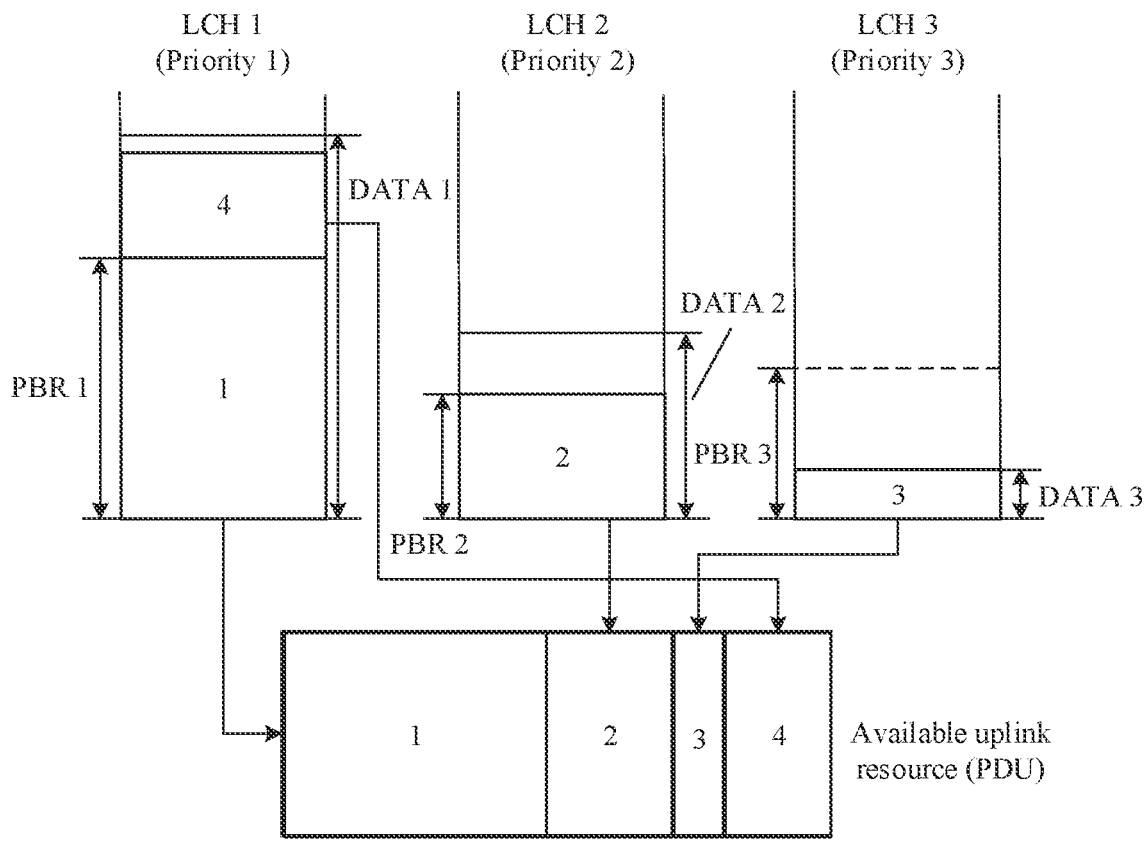
FIG. 4 is a schematic diagram of an uplink resource allocation result according to a token bucket algorithm.

FIG. 4 is a schematic diagram of an allocation result of an uplink resource according to the foregoing first-round allocation algorithm and second-round allocation algorithm. In FIG. 4, M=3, to be specific, there are three logical channels: an LCH 1, an LCH 2, and an LCH 3. A priority of the LCH 1 is 1, a priority of the LCH 2 is 2, and a priority of the LCH 3 is 3. It is assumed that a smaller value indicates a higher priority, so that the LCH 1 has the highest priority, the LCH 2 has the second highest priority, and the LCH 3 has the lowest priority. To-be-transmitted data on the LCH 1 is DATA 1, and a prioritized bit rate of the LCH 1 is a PBR 1; to-be-transmitted data on the LCH 2 is DATA 2, and a prioritized bit rate of the LCH 2 is a PBR 2; to-be-transmitted data on the LCH 3 is DATA 3, and a prioritized bit rate of the LCH 3 is a PBR 3.

The terminal device may first perform the first-round allocation. To be specific, the terminal device preferably allocates an uplink resource to the LCH 1, and multiplexes an SDU 1 into a PDU. Because the LCH 1 has reached a limit of the PBR 1, the terminal device may subsequently process the LCH 2, and multiplex an SDU 2 into the PDU. Because the LCH 2 has reached a limit of the PBR 2, the terminal device may subsequently process the LCH 3, and multiplex an SDU 3 into the PDU. As shown in FIG. 4, although the LCH 3 does not exceed a limit of the PBR 3, there is no data to be transmitted on the LCH 3. In this case, because the uplink resource is not exhausted, and there is still to-be-transmitted data on the LCH 1 and the LCH 2, the terminal device may continue to perform the second-round allocation. The terminal device multiplexes an SDU 4 of the LCH 1 into the PDU. In this case, although there is still data to be transmitted on the LCH 1, the uplink resource is exhausted and cannot be further allocated.

In conclusion, the foregoing algorithm achieves fairness of uplink resource allocation to some extent, and ensures a minimum uplink transmission rate of each logical channel. However, the foregoing algorithm only ensures the minimum uplink transmission rate of each logical channel, but does not limit an uplink transmission rate of each logical channel. This may cause a high uplink transmission rate of the logical channel, and consequently cause network congestion. For example, in a network slice scenario, one logical channel may correspond to one network slice, and one network slice may correspond to one or more logical channels. If the uplink transmission rate of each logical channel is not limited, the uplink transmission rate of each logical channel of the terminal device may exceed a bearer capability (namely, an upper limit of a total of uplink transmission rates of all logical channels in a single network slice) of the network slice corresponding to the logical channel, and network congestion is caused.

In view of this, this application provides an uplink data transmission control method and apparatus, so that rate control on a logical channel can be implemented when a terminal device performs uplink transmission, to help reduce a network congestion risk.

Before the method provided in this application is described, the following descriptions are first provided.

First, in this application, an "indication" may include a direct indication and an indirect indication, or may include an explicit indication and an implicit indication. Information indicated by a piece of information (for example, an uplink maximum bit rate described below) is referred to as to-be-indicated information. In a specific implementation process, the to-be-indicated information may be indicated in a plurality of manners, for example, but not limited to, a manner of directly indicating the to-be-indicated information. For example, the to-be-indicated information is indicated by using the to-be-indicated information or an index of the to-be-indicated information. Alternatively, the to-be-indicated information may be indirectly indicated by indicating other information, and there is an association relationship between the foregoing other information and the to-be-indicated information. Alternatively, only a part of the to-be-indicated information may be indicated, and the other part of the to-be-indicated information is already known or pre-agreed on. For example, specific information may alternatively be indicated by using an arrangement sequence of a plurality of pieces of information that is pre-agreed on (for example, specified in a protocol), to reduce indication overheads to some extent.

Second, in embodiments shown below, terms and English acronyms and abbreviations, such as Media Access Control (media access control, MAC), an uplink maximum bit rate (uplink maximum bit rate, UMBR) of a logical channel, and a prioritized bit rate (prioritized bit rate, PBR). Examples are provided for ease of description, and shall not constitute any limitation on this application. This application does not exclude a possibility of defining another term that can implement a same or similar function in an existing or a future protocol.

Third, "first", "second", and various sequence numbers in the following embodiments are merely used for differentiation for ease of description, and are not used to limit the scope of embodiments of this application. For example, the various sequence numbers are used for distinguishing between different information or distinguishing between different logical channels.

Fourth, in embodiments shown below, "pre-obtaining" may include being indicated by the network device by using signaling or predefined, for example, defined in a protocol. "Predefinition" may be implemented by pre-storing corresponding code or a corresponding table in a device (for example, including a terminal device and a network device) or in another manner that can be used to indicate related information. A specific implementation of "predefinition" is not limited in this application.

Fifth, a "protocol" in embodiments of this application may be a standard protocol in the communication field, for example, may include an LTE protocol, an NR protocol, and a related protocol applied to a future communication system. This is not limited in this application.

Sixth, in embodiments of this application, a "logical channel" is used as an example for description. However, it should be understood that, if a radio bearer is in one-to-one correspondence with a logical channel, the logical channel in embodiments of this application may be replaced with a radio bearer or another term corresponding to the logical channel. This is not limited in this embodiment of this application. In addition, in this embodiment of this application, an "uplink bit rate" is used to describe a transmission rate of uplink data of the terminal device. This is merely an example for description. The uplink bit rate in this embodiment of this application may be replaced with an uplink transmission rate, an uplink sending rate, or another term. This is not limited in this embodiment of this application either.

The following describes in detail embodiments provided in this application with reference to FIG. 5 to FIG. 10.

In embodiments of this application, the terminal device and the network device are used as examples for description. It should be understood that, the terminal device may be replaced with an apparatus or a chip that can implement a function similar to that of the terminal device, or the network device may be replaced with an apparatus or a chip that can implement a function similar to that of the network device. A name of the apparatus or the chip is not limited in embodiments of this application.

Figure 5:
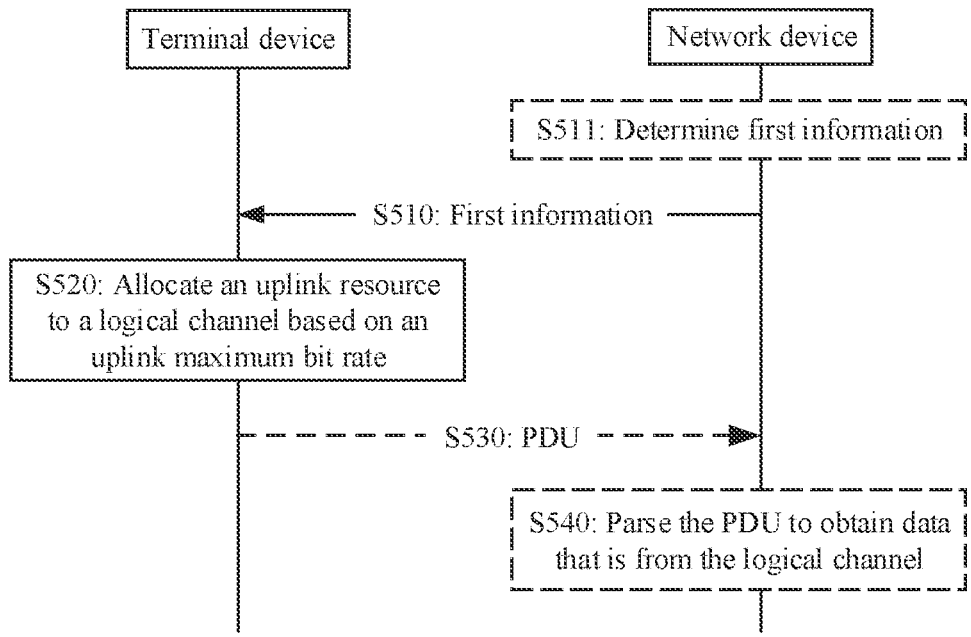
FIG. 5 is a schematic flowchart of an uplink data transmission control method according to an embodiment of this application.

FIG. 5 is a schematic flowchart of an uplink data transmission control method 500 according to an embodiment of this application. The method 500 may be applied to the communication system 100 shown in FIG. 1. This is not limited in this embodiment of this application. The method 500 may include the following steps.

S510. A network device sends first information to a terminal device, and correspondingly, the terminal device receives the first information from the network device, where the first information is used to indicate an uplink maximum bit rate of each of at least one logical channel.

Optionally, before S510, the method 500 further includes the following step.

S511: The network device determines the first information.

The "uplink maximum bit rate of each of the at least one logical channel" herein means that the network device may configure a respective uplink maximum bit rate for each of the at least one logical channel. For example, the at least one logical channel is five logical channels, the network device may configure five uplink maximum bit rates for the five logical channels. The five uplink maximum bit rates may be completely or partially the same, or may be completely the same. This is not limited in this embodiment of this application. For example, five fields in the first information respectively indicate the five uplink maximum bit rates, and the five fields respectively correspond to the five logical channels. Alternatively, when the five uplink maximum bit rates are completely or partially the same, a plurality of logical channels with a same uplink maximum bit rate occupy a same field in the first information, and the field may correspond to the plurality of logical channels. In this way, when there is a large quantity of the at least one logical channel, signaling overheads can be reduced.

S520: The terminal device allocates an uplink resource to all or a part of logical channels in the at least one logical channel based on the uplink maximum bit rate.

The allocating the uplink resource to "all or a part of" logical channels herein means that when the uplink resource is sufficient, the terminal device may allocate the uplink resource to logical channels based on uplink maximum bit rates of the logical channels; when the uplink resource is insufficient, the terminal device may allocate the uplink resource to a part of the at least one logical channel, and correspondingly, in this case, the terminal device allocates the uplink resource to the part of the logical channel based on an uplink maximum bit rate of the part of the logical channel. That is, not all logical channels in the at least one logical channel can be allocated with the uplink resource, and a part of the logical channel may not be allocated with the uplink resource. This is not limited in this embodiment of this application.

According to the method 500, the network device indicates the uplink maximum bit rate of the at least one logical channel to the terminal device, so that the terminal device allocates the uplink resource to the logical channel based on a limit of the uplink maximum bit rate, to implement rate control on the logical channel when the terminal device performs uplink transmission, and help reduce a network congestion risk.

It should be understood that, an uplink maximum bit rate of a logical channel indicates an upper limit of a bit rate in uplink transmission on the logical channel. For a logical channel, if the terminal device allocates a large quantity of uplink resources to the logical channel, an uplink bit rate of the logical channel is high; if the terminal device allocates a small quantity of uplink resources to the logical channel, an uplink bit rate of the logical channel is low. Therefore, the terminal device may allocate an uplink resource to the logical channel based on an uplink maximum bit rate of the logical channel, so that the uplink bit rate of the logical channel is controlled not to exceed the uplink maximum bit rate of the logical channel.

Radio bearers include two types: a data radio bearer (data radio bearer, DRB) and a signaling radio bearer (signaling radio bearer, SRB). During allocation, the terminal device may preferably transmit data of the SRB, in other words, preferably meet an uplink resource requirement of a logical channel corresponding to the SRB. Therefore, in a possible implementation, the method in this embodiment of this application is mainly applicable to a logical channel corresponding to the data radio bearer (data radio bearer, DRB). That is, the at least one logical channel is the logical channel corresponding to the DRB.

Optionally, the first information may be sent by the network device by using radio resource control (radio resource control, RRC) signaling, for example, a Logical-ChannelConfig information element.

Optionally, the at least one logical channel may correspond to one network slice. An uplink maximum bit rate of a network slice is specific to a single network slice, and indicates an upper limit of bit rates in uplink transmission on all logical channels corresponding to the network slice. For ease of differentiation and description, in this embodiment of this application, an uplink maximum bit rate of a logical channel is briefly denoted as a UMBR, and an uplink maximum bit rate of a network slice is briefly denoted as $R_{slice}^{max}$.

Optionally, the at least one logical channel may correspond to one PDU session. Similar to the network slice, an uplink maximum bit rate of a PDU session is specific to a single PDU session, and indicates an upper limit of bit rates in uplink transmission on all logical channels corresponding to the PDU session.

One network slice may include one or more PDU sessions. This is not limited in this embodiment of this application. Uplink transmission rates on the logical channels corresponding to the network slice are limited, so that uplink rate control in the network slice can be implemented, and a network congestion risk at a network slice granularity is reduced. Similarly, uplink transmission rates on the logical channels corresponding to the PDU session are limited, so that uplink rate control in the PDU session can be implemented, and a network congestion risk at a PDU session granularity is reduced. For ease of description, the uplink data transmission control method in embodiments of this application is described below by using only the network slice as an example.

In this embodiment of this application, to avoid overload of an uplink transmission rate in a network slice, a sum of UMBRs of all logical channels corresponding to one network slice is less than or equal to an uplink maximum bit rate of the network slice.

Optionally, after S520, the method 500 may further include the following steps.

S530: The terminal device sends a protocol data unit PDU to the network device. Correspondingly, the network device receives the PDU from the terminal device. The PDU includes data from one or more logical channels, the data from the one or more logical channels is multiplexed into the PDU based on an uplink maximum bit rate of the one or more logical channels, and the one or more logical channels may correspond to one or more network slices.

S540: The network device parses the PDU to obtain the data that is from the logical channels.

Specifically, the terminal device may allocate the uplink resource to each logical channel according to S510 and S520, that is, multiplex an SDU that is on each logical channel into the PDU, and then the terminal device may send the PDU to the network device. The PDU sent by the terminal device may include data (namely, an SDU) from one or more logical channels, and the one or more logical channels may correspond to one or more network slices. For example, the PDU received by the network device may include data on a logical channel 1, a logical channel 2, and a logical channel 3. The logical channel 1 and the logical channel 2 correspond to a network slice 1, and the logical channel 3 corresponds to a network slice 2.

In an optional embodiment, that the terminal device allocates an uplink resource to all or a part of logical channels in the at least one logical channel based on the uplink maximum bit rate includes: The terminal device allocates the uplink resource to all or the part of logical channels in the at least one logical channel based on a prioritized bit rate of the at least one logical channel and the uplink maximum bit rate.

In this way, based on a prioritized bit rate of a logical channel and an uplink maximum bit rate, not only a problem that a logical channel with a low priority cannot always be served is avoided, but also an uplink transmission rate of the logical channel can be limited not to exceeding an upper limit of a transmission rate of the logical channel, to reduce a network congestion risk.

In a possible implementation, because a UMBR is an upper limit of a bit rate in uplink transmission on a logical channel, the UMBR of the logical channel is greater than or equal to a prioritized bit rate PBR of the logical channel. That is, for a logical channel j in any network slice i, $$\sum_{LCH_j \in slice_i} UMBR_j \leq R_{slice}^{max};$$

and $0 \leq PBR_j \leq UMBR_j$, where both i and j are positive integers.

It should be understood that, the first information may carry the uplink maximum bit rate, or may carry a maximum amount of data that can be transmitted in an uplink within specific time. The maximum amount of data that can be transmitted in the uplink within the specific time and the uplink maximum bit rate may be mutually converted. In addition, the PBR of the logical channel may be obtained by the terminal device in advance. For example, the PBR of the logical channel may be configured by the network device for the terminal device by using configuration information (for example, the LogicalChannelConfig information element). The configuration information and the first information may be different information, or may be same information, to be specific, the network device may separately configure the UMBR of the logical channel and the PBR of the logical channel for the terminal device by using two different fields of the same information. This is not limited in this embodiment of this application.

According to the uplink data transmission control method in this embodiment of this application, the network device configures the uplink maximum bit rate of the logical channel for the terminal device, to ensure that the sum of uplink maximum bit rates of all the logical channels corresponding to the network slice is less than or equal to the uplink maximum bit rate in the network slice. In this way, an uplink transmission rate of the terminal device in the network slice is controlled. This helps avoid a problem that the uplink transmission rate in the network slice is overloaded when the terminal device transmits uplink data, and reduces a network congestion risk.

In a first possible implementation, the terminal device may perform the foregoing first-round allocation algorithm based on the foregoing PBR of a logical channel, and a case in which an uplink bit rate of the logical channel reaches a limit of the PBR of the logical channel occurs. If there is a remaining uplink resource, and there is a logical channel with to-be-transmitted data, the terminal device performs the foregoing second-round allocation algorithm, that is, allocates, based on the foregoing UMBR of a logical channel, the uplink resource to the logical channel still with to-be-transmitted data, and a case in which there is no data to be transmitted on all logical channels, the uplink resource is exhausted, or the logical channel reaches a limit of the UMBR of the logical channel occurs.

In a second possible implementation, the terminal device may allocate a resource to a logical channel based only on the foregoing UMBR. For example, the terminal device may not perform the foregoing first-round allocation algorithm, but directly perform the foregoing second-round allocation algorithm on a logical channel with to-be-transmitted data, to be specific, allocate the uplink resource to the logical channel based on the UMBR of the logical channel. A case in which there is no data to be transmitted on all logical channels, the uplink resource is exhausted, or the logical channel reaches a limit of the UMBR of the logical channel occurs.

In a third possible implementation, the terminal device may allocate a resource to a logical channel based on the foregoing UMBR and another principle. For example, the terminal device may allocate the uplink resource to the logical channel based on another principle (for example, allocate the uplink resource based on a data amount, of a predefined value, of each logical channel), and then perform the foregoing second-round allocation algorithm, that is, allocate, based on the UMBR of the logical channel, the uplink resource to a logical channel still with to-be-transmitted data. A case in which there is no data to be transmitted on all logical channels, the uplink resource is exhausted, or the logical channel reaches a limit of the UMBR of the logical channel occurs.

In the second possible implementation and the third possible implementation, because the terminal device does not perform allocation based on the PBR (in other words, does not perform the first-round allocation according to a token bucket algorithm), the network device may configure only the UMBR of the logical channel for the terminal device and not configure the PBR. Further, the network device may alternatively not configure a priority and BSD. In this case, optionally, when the logical channel include a plurality of logical channels, the terminal device may sort the plurality of logical channels based on amounts of to-be-transmitted data on the logical channels (for example, in ascending order or descending order), or the terminal device may randomly sort logical channels with to-be-transmitted data, to determine processing priorities of the logical channels, so that the uplink resource is allocated to the logical channels in descending order of the priorities.

In the foregoing three possible implementations, the following cases may occur in the second-round allocation performed by the terminal device.

(1) If the to-be-transmitted data on the logical channel does not exceed the UMBR of the logical channel, and the uplink resource is sufficient, the terminal device may directly multiplex the data that is on the logical channel into the PDU, and then continue to process a logical channel with a next priority.

(2) If the to-be-transmitted data on the logical channel does not exceed the UMBR of the logical channel, and the uplink resource is insufficient, the terminal device may perform segmentation processing on the data that is on the logical channel, and multiplex a maximum segment into the PDU based on the uplink resource.

(3) If the to-be-transmitted data on the logical channel exceeds the UMBR of the logical channel, and the uplink resource is sufficient, the terminal device may perform segmentation processing on the data that is on the logical channel, multiplex a maximum segment into the PDU based on the UMBR, and then continue to process a next logical channel.

(4) If the to-be-transmitted data on the logical channel exceeds the UMBR of the logical channel, and the uplink resource is insufficient, the terminal device may perform segmentation processing on the data that is on the logical channel, multiplex a maximum segment into the PDU based on a smaller one of the UMBR and an amount of data that can be transmitted on a remaining uplink resource, and then continue to process a next logical channel.

The multiplexing a maximum segment means multiplexing, into the PDU, a sub-SDU obtained by performing SDU segmentation processing, where the uplink bit rate of the logical channel is equal to the uplink maximum bit rate of the logical channel.

The following describes in detail the first possible implementation. That the terminal device allocates an uplink resource to all or a part of logical channels in the at least one logical channel based on the uplink maximum bit rate includes: The terminal device allocates the uplink resource to all or the part of logical channels in the at least one logical channel based on the prioritized bit rate of the at least one logical channel and the uplink maximum bit rate.

In this way, based on a prioritized bit rate of a logical channel and an uplink maximum bit rate, not only a problem that a logical channel with a low priority cannot always be served is avoided, but also an uplink transmission rate of the logical channel can be limited not to exceeding an upper limit of a transmission rate of the logical channel, to reduce a network congestion risk.

In an optional embodiment, that the terminal device allocates the uplink resource to the logical channel based on the uplink maximum bit rate of the logical channel includes: The terminal device allocates the uplink resource to the logical channel based on the prioritized bit rate of the logical channel. If there is a remaining uplink resource, and there is still data to be transmitted on a first logical channel in the logical channel, the terminal device allocates the remaining uplink resource based on an uplink maximum bit rate of the first logical channel until any one of the following conditions is met: there is no data to be transmitted on the first logical channel, the remaining uplink resource is exhausted, or an uplink bit rate of the first logical channel reaches the uplink maximum bit rate of the first logical channel.

Specifically, the terminal device may allocate the uplink resource to the logical channel according to a token bucket algorithm. To be specific, the terminal device may first perform the first-round allocation, and allocate the uplink resource to the logical channel based on the prioritized bit rate of the logical channel until any one of the following conditions is met: the uplink bit rate of the logical channel reaches the limit of the prioritized bit rate of the logical channel, or the uplink resource is exhausted. After the first-round allocation, the uplink bit rate of the logical channel is less than or equal to the prioritized bit rate of the logical channel from a perspective of time averaging. When the logical channel includes a plurality of logical channels, the terminal device may allocate the uplink resource to the plurality of logical channels based on prioritized bit rates of the plurality of logical channels and in descending order of priorities until any one of the following conditions is met: uplink bit rates of the plurality of logical channels all reach limits of the prioritized bit rates respectively, or the uplink resource is exhausted, so that the uplink bit rates of the plurality of logical channels are less than or equal to the prioritized bit rates respectively from a perspective of time averaging. For a specific allocation method, refer to the description of the first-round allocation in the foregoing token bucket algorithm, and details are not described herein again.

It should be understood that, an uplink bit rate of a logical channel is an average value within a time period. For example, for a logical channel, in a single TTI, an uplink bit rate of the logical channel is allowed to exceed an uplink maximum bit rate of the logical channel in this application. However, after the uplink bit rate of the logical channel exceeds the uplink maximum bit rate of the logical channel, the logical channel is suspended, to be specific, in a next TTI, the terminal device no longer allocates the uplink resource to the logical channel until the uplink bit rate of the logical channel is less than or equal to the uplink maximum bit rate of the logical channel.

After the first-round allocation is completed, if there is still the remaining uplink resource, and there is still the data to be transmitted on the first logical channel in the foregoing logical channel, the terminal device may perform the second-round allocation. It should be understood that, the first logical channel is a logical channel whose uplink bit rate is less than an uplink maximum bit rate of the logical channel in logical channels still with to-be-transmitted data. For all logical channels whose uplink bit rates have reached uplink maximum bit rates in the first-round allocation, the second-round allocation is no longer performed regardless of whether there is still data to be sent.

The terminal device may allocate the remaining uplink resource based on the uplink maximum bit rate of the first logical channel, namely, the UMBR of the first logical channel, until any one of the following conditions is met: there is no data to be transmitted on the first logical channel, or the remaining uplink resource is exhausted, so that the uplink bit rate of the first logical channel is less than or equal to the UMBR of the first logical channel from a perspective of time averaging. The first logical channel may be one logical channel, or may include a plurality of logical channels. The following describes in detail a process of the second-round allocation in two cases.

Case 1: In an optional embodiment, the first logical channel is one logical channel, and that the terminal device allocates the remaining uplink resource based on the uplink maximum bit rate of the first logical channel includes: If a sum of an uplink bit rate of a first service data unit SDU that is on the first logical channel and that is not multiplexed into a protocol data unit PDU and an uplink bit rate of a second SDU that is on the first logical channel and that has been multiplexed into the PDU is less than or equal to the uplink maximum bit rate of the first logical channel, the terminal device multiplexes the first SDU into the PDU. Alternatively, if a sum of an uplink bit rate of a first SDU and an uplink bit rate of a second SDU is greater than the uplink maximum bit rate of the first logical channel, the terminal device performs segmentation processing on the first SDU to obtain a first sub-SDU, and multiplexes the first sub-SDU into the PDU.

In other words, if the first SDU on the first logical channel and the second SDU that is on the first logical channel and that has been multiplexed into the PDU can meet a limit of the UMBR of the first logical channel, the terminal device may multiplex the first SDU into the PDU. Otherwise, the terminal device may perform segmentation processing on the first SDU, and multiplex the obtained first sub-SDU into the PDU, to enable a sum of an uplink bit rate of the first sub-SDU and the uplink bit rate of the second SDU to be equal to the UMBR of the first logical channel. That is, when allocating an uplink resource, the terminal device may not segment an SDU as much as possible, and multiplex a larger SDU segment into the PDU as much as possible during SDU segmentation, so that data transmission on a logical channel is maximized.

Case 2: In an optional embodiment, the first logical channel includes at least two logical channels, and that the terminal device allocates the remaining uplink resource based on the uplink maximum bit rate of the first logical channel includes: The terminal device allocates the remaining uplink resource based on uplink maximum bit rates of the at least two logical channels and in descending order of priorities of the at least two logical channels until any one of the following conditions is met: there is no data to be transmitted on the at least two logical channels, the remaining uplink resource is exhausted, or uplink bit rates of the at least two logical channels reach limits of the uplink maximum bit rates of the at least two logical channels.

For example, that the terminal device allocates the remaining uplink resource based on uplink maximum bit rates of the at least two logical channels and in descending order of priorities of the at least two logical channels includes: The terminal device selects a second logical channel from the at least two logical channels, where the second logical channel is a logical channel with a highest priority in the at least two logical channels. If a sum of an uplink bit rate of a third SDU that is on the second logical channel and that is not multiplexed into a PDU and an uplink bit rate of a fourth SDU that is on the second logical channel and that has been multiplexed into the PDU is less than or equal to an uplink maximum bit rate of the second logical channel, the terminal device multiplexes the third SDU into the PDU. Alternatively, if a sum of an uplink bit rate of a third SDU that is on the second logical channel and that is not multiplexed into a PDU and an uplink bit rate of a fourth SDU that is on the second logical channel and that has been multiplexed into the PDU is greater than an uplink maximum bit rate of the second logical channel, the terminal device performs segmentation processing on the third SDU to obtain a third sub-SDU, and multiplexes the third sub-SDU into the PDU.

In other words, the first logical channel includes at least two logical channels, and the second logical channel has the highest priority. Therefore, the terminal device preferably allocates the uplink resource to the second logical channel. If the third SDU on the second logical channel and the fourth SDU that is on the second logical channel and that has been multiplexed into the PDU can meet a limit of the UMBR of the second logical channel, the terminal device may multiplex the third SDU into the PDU. Otherwise, the terminal device may perform segmentation processing on the third SDU, and multiplex the obtained third sub-SDU into the PDU, to enable a sum of an uplink bit rate of the third sub-SDU and the uplink bit rate of the fourth SDU to be equal to the UMBR of the second logical channel. That is, when allocating the uplink resource, the terminal device may not segment an SDU as much as possible, and multiplex a larger SDU segment into the PDU as much as possible during SDU segmentation, so that data transmission on a logical channel is maximized.

After the terminal device allocates the uplink resource to the second logical channel according to the foregoing method, if there is still a remaining uplink resource, the terminal device may continue to allocate the uplink resource to a logical channel with a next priority, where the logical channel with the next priority is a logical channel that is with a priority next to that of the second logical channel and that is in the at least two logical channels. A specific allocation method is similar, and details are not described herein again.

It should be understood that, in a process of the second-round allocation in this embodiment of this application, the terminal device may comply with the following principles:

(1) if an entire SDU that is on a logical channel can be filled in a remaining PDU and does not reach a limit of a UMBR of the logical channel, the terminal device should not segment the SDU;

(2) if the terminal device needs to segment an SDU that is on a logical channel due to a limit of a UMBR, the terminal device should fill in a maximum segment as much as possible based on a size of a remaining resource and the UMBR of the logical channel, that is, the terminal device should maximize data transmission; and (3) if a radio bearer or a logical channel is suspended (a quantity of tokens is less than 0), the terminal device should not transmit data that is on the logical channel corresponding to the radio bearer.

Figure 6:
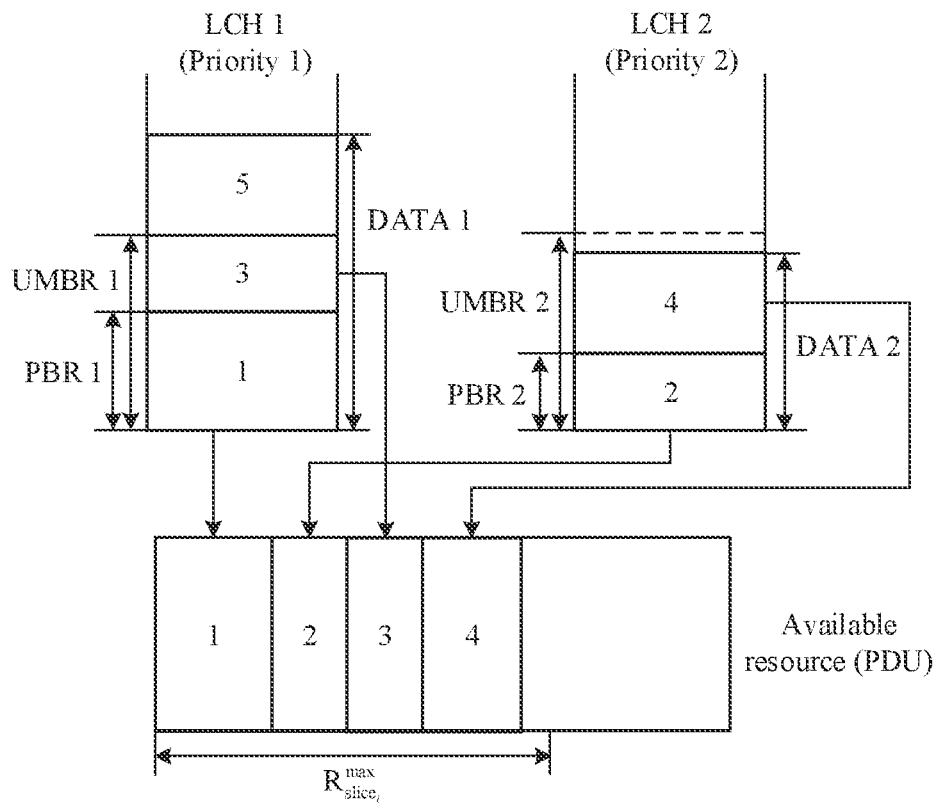
FIG. 6 is a schematic diagram of an uplink resource allocation result according to an embodiment of this application.

FIG. 6 is a schematic diagram of an uplink resource allocation result according to an embodiment of this application. In FIG. 6, there are two logical channels: an LCH 1 and an LCH 2, and the LCH 1 and the LCH 2 correspond to one network slice i. A priority of the LCH 1 is 1, and a priority of the LCH 2 is 2. It is assumed that a smaller value indicates a higher priority, so that the LCH 1 has the highest priority, and the LCH 2 has the second highest priority. To-be-transmitted data on the LCH 1 is DATA 1, a prioritized bit rate of the LCH 1 is a PBR 1, and an uplink maximum bit rate of the LCH 1 is a UMBR 1; to-be-transmitted data on the LCH 2 is DATA 2, a prioritized bit rate of the LCH 2 is a PBR 2, and an uplink maximum bit rate of the LCH 2 is a UMBR 2. An uplink maximum bit rate of the network slice i is $R_{slice_i}^{max}$, and a sum of the UMBR 1 and the UMBR 2 is less than $R_{slice_i}^{max}$.

According to the method in this embodiment of this application, the first-round allocation is first performed. To be specific, a terminal device preferably allocates an uplink resource to the LCH 1, and multiplexes an SDU 1 into a PDU, and a case in which an uplink bit rate of the LCH 1 reaches a limit of the PBR 1 occurs. Then, the terminal device may process the LCH 2, and multiplex an SDU 2 into the PDU, and a case in which an uplink bit rate of the LCH 2 reaches a limit of the PBR 2 occurs. Because the uplink resource has been allocated to both the LCH 1 and the LCH 2, and there is still a remaining uplink resource, the terminal device may subsequently perform the second-round allocation. The terminal device multiplexes an SDU 3 of the LCH 1 into the PDU, and a case in which the uplink bit rate of the LCH 1 reaches a limit of the UMBR 1 occurs. In this case, although there is still data to be transmitted on the LCH 1, the uplink bit rate of the LCH 1 has reached the limit of the UMBR 1, and the uplink resource cannot be allocated to the LCH 1 anymore. Because there is still a remaining uplink resource, the terminal device multiplexes an SDU 4 of the LCH 2 into the PDU. Although the uplink bit rate of the LCH 2 does not reach a limit of the UMBR 2, there is no data to be transmitted on the LCH 2. According to the method in this embodiment of this application, an actual uplink bit rate of the network slice i is less than the uplink maximum bit rate of the network slice i.

It should be understood that, FIG. 6 shows only an ideal case: After the SDU 1 (which may include one or more SDUs) is multiplexed into the PDU, the uplink bit rate of the LCH 1 is exactly equal to the PBR 1, and after the SDU 2 (which may include one or more SDUs) is multiplexed into the PDU, the uplink bit rate of the LCH 2 is exactly equal to the PBR 2. In addition, the SDU 3 may include one SDU, a plurality of SDUs, or a sub-SDU obtained by performing segmentation processing. This is because the terminal device may segment an SDU according to a second-round allocation algorithm, to enable the uplink bit rate of the LCH 1 to be equal to the UMBR 1.

In the method 500, the network device configures an uplink maximum bit rate of a logical channel for the terminal device, to ensure that a sum of uplink maximum bit rates of all logical channels corresponding to one network slice is less than or equal to an uplink maximum bit rate in the network slice. The terminal device needs to perform the second-round resource allocation for the logical channel based on the uplink maximum bit rate of the logical channel. In this way, an uplink transmission rate of the terminal device in the network slice is controlled. This helps avoid a problem that the uplink transmission rate in the network slice is overloaded when the terminal device transmits uplink data, and reduces a network congestion risk.

An embodiment of this application further provides another uplink data transmission control method, so that the terminal device can also control an uplink transmission rate in a network slice.

Figure 7:
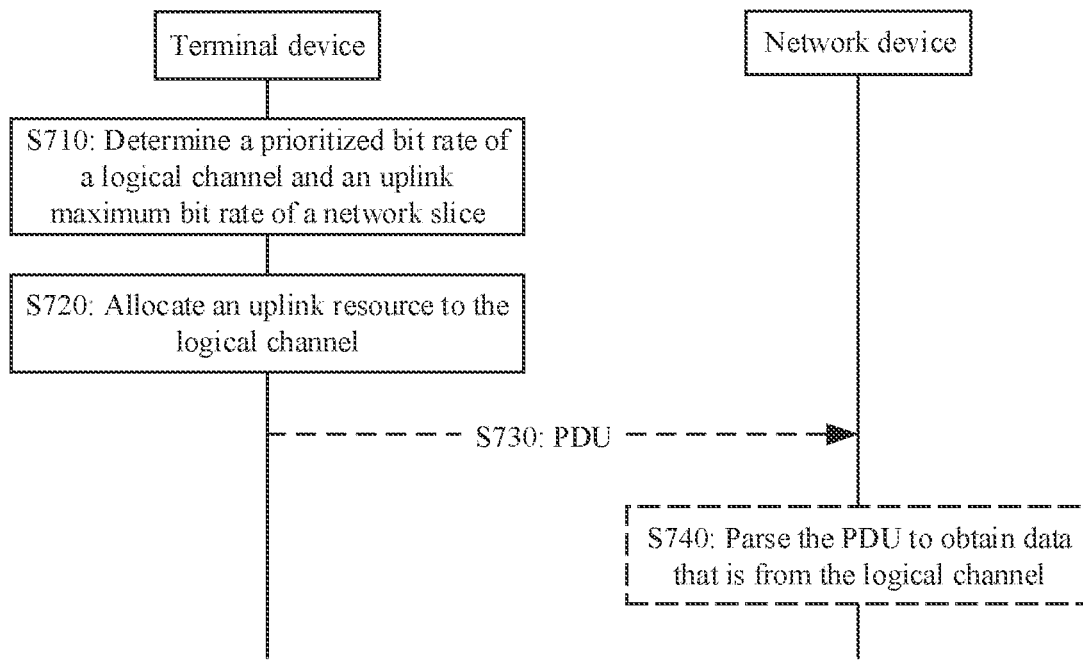
FIG. 7 is a schematic flowchart of another uplink data transmission control method according to an embodiment of this application.

FIG. 7 is a schematic flowchart of another uplink data transmission control method 700 according to an embodiment of this application. The method 700 may be applied to the communication system 100 shown in FIG. 1. This is not limited in this embodiment of this application. The method 700 may include the following steps.

S710: A terminal device determines a prioritized bit rate PBR of a logical channel and an uplink maximum bit rate of a network slice, where the logical channel corresponds to the network slice.

S720: The terminal device allocates an uplink resource to the logical channel based on the prioritized bit rate of the logical channel and the uplink maximum bit rate of the network slice.

The logical channel may include one or more logical channels, and the one or more logical channels correspond to one or more network slices. For example, it is assumed that there are three logical channels, a logical channel 1, a logical channel 2, and a logical channel 3. The three logical channels may correspond to two network slices. To be specific, the logical channel 1 and the logical channel 2 correspond to a network slice 1, and the logical channel 3 corresponds to a network slice 2. It should be understood that, an uplink maximum bit rate of a network slice is specific to a single network slice, and indicates an upper limit of bit rates in uplink transmission on all logical channels corresponding to the network slice. For ease of description, in this embodiment of this application, the uplink maximum bit rate of the network slice is briefly denoted as $R_{slice}^{max}$.

It should be understood that, the PBR of the logical channel and $R_{slice}^{max}$ of the network slice may be obtained by the terminal device in advance. For example, the PBR of the logical channel may be configured by the network device for the terminal device by using configuration information (for example, a LogicalChannelConfig information element). $R_{slice}^{max}$ of the network slice may be configured by a network device for the terminal device, or may be defined in a protocol. This is not limited in this embodiment of this application.

According to the uplink data transmission control method in this embodiment of this application, the terminal device allocates the uplink resource to the logical channel based on the uplink maximum bit rate of the network slice, to ensure that a sum of uplink bit rates of all logical channels corresponding to the network slice is less than or equal to the uplink maximum bit rate in the network slice. In this way, an uplink transmission rate of the terminal device in the network slice is controlled. This helps avoid a problem that the uplink transmission rate in the network slice is overloaded when the terminal device transmits uplink data, and reduces a network congestion risk.

Optionally, after S720, the method 700 may further include the following steps.

S730: The terminal device sends a protocol data unit PDU to the network device. Correspondingly, the network device receives the PDU from the terminal device, where the PDU includes data from a logical channel, the logical channel corresponds to the network slice, and the data from the logical channel is multiplexed into the PDU based on the prioritized bit rate of the logical channel and the uplink maximum bit rate of the network slice.

S740: The network device parses the PDU to obtain the data that is from the logical channel.

Specifically, the terminal device may allocate the uplink resource to each logical channel according to S710 and S720, that is, multiplex an SDU that is on each logical channel into the PDU, and then the terminal device may send the PDU to the network device. The PDU sent by the terminal device may include data (namely, an SDU) from one or more logical channels, and the one or more logical channels may correspond to one or more network slices.

In an optional embodiment, the logical channel is one logical channel, and that the terminal device allocates an uplink resource to the logical channel based on the prioritized bit rate of the logical channel and the uplink maximum bit rate of the network slice includes: The terminal device allocates the uplink resource to the logical channel based on the prioritized bit rate of the logical channel and the uplink maximum bit rate of the network slice until any one of the following conditions is met: an uplink bit rate of the logical channel reaches a limit of the prioritized bit rate of the logical channel, an uplink bit rate of the network slice exceeds the uplink maximum bit rate of the network slice, or the uplink resource is exhausted.

In an optional embodiment, the logical channel includes at least two logical channels, and that the terminal device allocates an uplink resource to the logical channel based on the prioritized bit rate of the logical channel and the uplink maximum bit rate of the network slice includes: The terminal device allocates the uplink resource to the at least two logical channels in descending order of priorities of the at least two logical channels and based on prioritized bit rates of the logical channels and the uplink maximum bit rate of the network slice until any one of the following conditions is met: uplink bit rates of the at least two logical channels both reach limits of the prioritized bit rates of the at least two logical channels, an uplink bit rate of the network slice corresponding to the at least two logical channels reaches a limit of an uplink bit rate of the network slice corresponding to the at least two logical channels, or the uplink resource is exhausted.

Specifically, the foregoing allocation process is the first-round allocation. To be specific, the terminal device may allocate the uplink resource to the logical channels according to a new token bucket algorithm proposed in embodiments of this application, so that the uplink bit rates of the plurality of logical channels can be less than or equal to the prioritized bit rates respectively from a perspective of time averaging, and an uplink bit rate of each network slice can be less than or equal to a respective uplink maximum bit rate from a perspective of time averaging. The following describes in detail a first round-allocation algorithm (namely, the new token bucket algorithm) in this embodiment of this application.

In an optional embodiment, that the terminal device allocates the uplink resource to the at least two logical channels in descending order of priorities of the at least two logical channels and based on prioritized bit rates of the at least two logical channels and the uplink maximum bit rate of the network slice includes: When a quantity of tokens corresponding to a first logical channel in the at least two logical channels is greater than 0, the terminal device determines an accumulated uplink bit rate of a first network slice that corresponds to the first logical channel and that is in the network slice, after multiplexing a first service data unit SDU that is on the first logical channel in the at least two logical channels into a protocol data unit PDU, where the first logical channel is a logical channel with a highest priority in the at least two logical channels. If the accumulated uplink bit rate of the first network slice is less than or equal to an uplink maximum bit rate of the first network slice, the terminal device multiplexes the first SDU into the PDU. Alternatively, if the accumulated uplink bit rate of the first network slice is greater than an uplink maximum bit rate of the first network slice, and a quantity of tokens corresponding to a second logical channel in the at least two logical channels is greater than 0, after the terminal device determines to multiplex a second SDU that is on the second logical channel into the PDU, the terminal device obtains an accumulated uplink bit rate of a second network slice that corresponds to the second logical channel and that is in the network slice, where the second logical channel is a logical channel with a priority next to that of the first logical channel in the at least two logical channels. If the accumulated uplink bit rate of the second network slice is less than or equal to an uplink maximum bit rate of the second network slice, the terminal device multiplexes the second SDU into the PDU.

Specifically, in a process of the first-round allocation, the terminal device first allocates the uplink resource to the first logical channel with the highest priority, in descending order of the priorities of the at least two logical channels. If the accumulated uplink bit rate of the first network slice corresponding to the first logical channel exceeds a limit of the uplink maximum bit rate of the first network slice, the terminal device then allocates the uplink resource to the logical channel (namely, the second logical channel) with the next priority.

It should be understood that, the first network slice corresponding to the first logical channel and the second network slice corresponding to the second logical channel may be the same or may be different. In other words, the first logical channel and the second logical channel may correspond to a same network slice, or may correspond to different network slices. This is not limited in this embodiment of this application.

Figure 8:
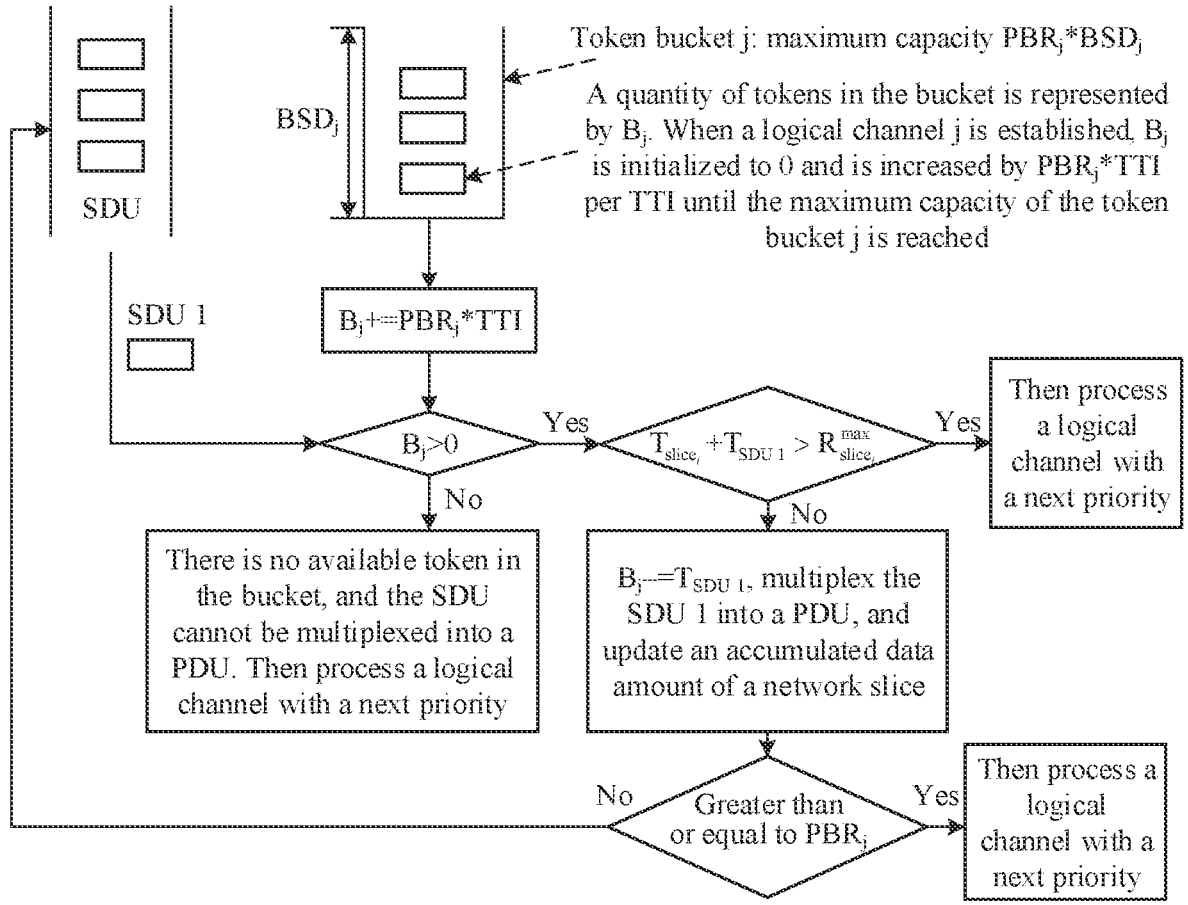
FIG. 8 is a schematic flowchart of a token bucket algorithm according to an embodiment of this application.

The following describes in detail the first-round allocation algorithm provided in embodiments of this application with reference to FIG. 8. Similar to FIG. 3, the terminal device may perform the following steps on logical channels in descending order of priorities. The following uses a logical channel j as an example for description.

Step 1 and step 2 are the same as step 1 and step 2 corresponding to FIG. 3, and details are not described herein again.

Step 3: If $B_j$ is greater than 0, the terminal device determines whether $T_{slice_i} + T_{SDU\ 1} > R_{slice_i}^{max}$, where $T_{slice_i} + T_{SDU\ 1}$ is an accumulated uplink bit rate of a network slice i corresponding to the logical channel j after an SDU 1 is multiplexed into the PDU, and $R_{slice_i}^{max}$ is an accumulated uplink bit rate of the network slice i.

Step 4: If $T_{slice_i} + T_{SDU\ 1} > R_{slice_i}^{max}$, a procedure of processing the logical channel j by the terminal device ends, and then the terminal device processes a next logical channel.

Step 5: If $T_{slice_i} + T_{SDU\ 1} \leq R_{slice_i}^{max}$, the terminal device multiplexes the SDU 1 into the PDU, updates an accumulated data amount of the network slice i, and performs $B_j -= T_{SDU\ 1}$, where $T_{SDU\ 1}$ indicates a data amount of the SDU 1, and $B_j -= T_{SDU\ 1}$ indicates that a value of $B_j$ is updated to a value of $B_j - T_{SDU\ 1}$.

Steps 6 to 8 are the same as steps 4 to 6 corresponding to FIG. 3, and details are not described herein again.

It should be understood that, in the first-round allocation algorithm, a minimum multiplexing unit is an SDU. After the terminal device multiplexes an SDU into the PDU, if an uplink bit rate of a current logical channel is greater than or equal to a PBR of the logical channel, the terminal device processes a logical channel with a next priority, and the current logical channel is suspended; if an uplink bit rate of a current logical channel is less than a PBR of the logical channel, the terminal device may continue to process a next SDU that is on the logical channel. Therefore, in a single TTI, an uplink bit rate of a logical channel may be greater than a PBR of the logical channel, equal to the PBR of the logical channel, or less than the PBR of the logical channel. This is allowed in the first-round allocation algorithm.

In this embodiment of this application, an amount of uplink data transmitted on all logical channels corresponding to one network slice within a time period may be referred to as an accumulated data amount of the network slice. Correspondingly, a ratio of the accumulated data amount of the network slice to the time period may be referred to as an accumulated uplink bit rate of the network slice. The time period may be a time period agreed on in a protocol or a time period configured by the network device. For example, the time period may be one or more TTIs, or may be a time period from creation of the network slice to a current TTI. This is not limited in this embodiment of this application. Therefore, the accumulated data amount of the network slice may be, for example, a sum of amounts of uplink data transmitted on all logical channels in the network slice within the current TTI, or a sum of all historical data since the network slice is created.

It should be understood that, the "accumulated data amount" and the "accumulated uplink bit rate" are merely examples provided for ease of description, and shall not constitute any limitation on this application. This application does not exclude a possibility of defining another term that can implement a same or similar function in an existing or a future protocol.

In an optional embodiment, the accumulated uplink bit rate of the first network slice is determined based on a length of a sliding time window of the first network slice and an accumulated data amount of the first network slice in the sliding time window, where the accumulated data amount of the first network slice in the sliding time window is a sum of amounts of data transmitted on all logical channels of the first network slice in a first time period starting from a current moment, and a length of the first time period is the length of the sliding time window.

Figure 9:
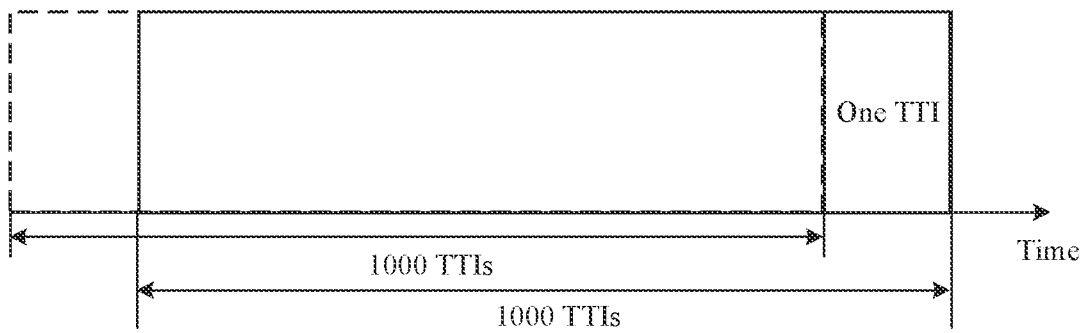
FIG. 9 is a schematic diagram of a sliding time window according to an embodiment of this application.

Duration of the time period is the length of the sliding time window. The sliding time window refers to a time period from the current moment (for example, a current TTI) to an earlier moment. For example, FIG. 9 is a schematic diagram of a sliding time window according to an embodiment of this application. As shown in FIG. 9, the length of the sliding time window of the first network slice may be 1000 TTIs, and the accumulated data amount of the first network slice is a sum of amounts of data transmitted on all the logical channels of the first network slice in a time period from the current TTI to 999 TTIs earlier than the current TTI.

A limit on a rate is a concept from a perspective of average time. For a single TTI, limitation is strong, and flexibility is low. Therefore, an accumulated data amount of a network slice in a latest time period (which may include a plurality of TTIs) can be obtained by setting a sliding time window. This helps limit an uplink bit rate of the network slice, and improves calculation flexibility of the uplink bit rate of the network slice.

It should be understood that, a length of a sliding time window of a network slice may be obtained by the terminal device in advance. Specifically, the length of the sliding time window of the network slice may be configured by the network device for the terminal device, or may be defined in a protocol. This is not limited in this embodiment of this application. In addition, the "sliding time window" is merely an example provided for ease of description, and the term may alternatively be replaced with a statistical time window, a sliding statistical time window, or another term. This is not limited in this embodiment of this application either.

In an optional embodiment, the method further includes: The network device determines a length of a sliding time window of the network slice. The network device sends second information to the terminal device. Correspondingly, the terminal device receives the second information sent by the network device, where the second information is used to indicate the length of the sliding time window of the network slice.

It should be understood that, lengths of sliding time windows corresponding to a plurality of network slices may be the same or may be different. If the sliding time windows corresponding to the plurality of network slices have a same length, the network device may indicate the length based on one piece of second information. If the lengths of the sliding time windows corresponding to the plurality of network slices are different, the network device may indicate identifiers of the network slices and the lengths of the sliding time windows of the network slices based on the second information, so that the lengths of the sliding time windows of the network slices correspond to the identifiers of the network slices respectively. For example, the second information may indicate a length 1, a length 2, and a length 3, and indicate that the length 1 corresponds to a network slice 1, the length 2 corresponds to a network slice 2, and the length 3 corresponds to a network slice 3.

Optionally, the network device may determine the length of the sliding time window of the network slice based on a type of the network slice. For example, for a network slice of a delay-sensitive service, a length of a sliding time window is short; for a network slice of a delay-insensitive service, a length of a sliding time window is long.

In this way, the network device may set different lengths of sliding time windows for different types of network slices, to adapt to different service features, and further flexibly adapt to a plurality of service scenarios.

In an optional embodiment, after that the terminal device allocates an uplink resource to the logical channel based on the prioritized bit rate of the logical channel and the uplink maximum bit rate of the network slice, the method further includes: If there is a remaining uplink resource, and there is still data to be transmitted on a third logical channel in the logical channel, the terminal device allocates the remaining uplink resource based on an uplink maximum bit rate of a network slice corresponding to the third logical channel, until any one of the following conditions is met: there is no data to be transmitted on the third logical channel, the remaining uplink resource is exhausted, or an accumulated uplink bit rate of the network slice corresponding to the third logical channel reaches a limit of the uplink maximum bit rate of the network slice corresponding to the third logical channel.

After the first-round allocation is completed, if there is still the remaining uplink resource, and there is still the data to be transmitted on the third logical channel in the foregoing logical channel, the terminal device may perform the second-round allocation. It should be understood that, the third logical channel is a logical channel that is in logical channels still with to-be-transmitted data and that corresponds to a network slice whose accumulated uplink bit rate is less than an uplink maximum bit rate of the network slice. For all logical channels that correspond to a network slice whose accumulated uplink bit rate has reached an uplink maximum bit rate in the first-round allocation, the second-round allocation is no longer performed regardless of whether there is still data to be sent.

The terminal device may allocate the remaining uplink resource based on the uplink maximum bit rate of the network slice corresponding to the third logical channel, until any one of the following conditions is met: there is no data to be transmitted on the third logical channel, the remaining uplink resource is exhausted, or the accumulated uplink bit rate of the network slice corresponding to the third logical channel reaches the limit of the uplink maximum bit rate of the network slice corresponding to the third logical channel. The third logical channel may be one logical channel, or may include a plurality of logical channels. The network slice corresponding to the third logical channel may be one network slice, or may be a plurality of network slices. The following describes in detail a process of the second-round allocation in two cases.

Case 1: In an optional embodiment, the third logical channel is one logical channel, and that the terminal device allocates the remaining uplink resource based on an uplink maximum bit rate of a network slice corresponding to the third logical channel includes: After a third SDU that is on the third logical channel and that is not multiplexed into the PDU is multiplexed into the PDU, if an accumulated uplink bit rate of a third network slice that is in the network slice and that corresponds to the third logical channel is less than or equal to an uplink maximum bit rate of the third network slice, the terminal device multiplexes the third SDU into the PDU. Alternatively, after a third SDU is multiplexed into the PDU, if an accumulated uplink bit rate of a third network slice is greater than an uplink maximum bit rate of the third network slice, the terminal device performs segmentation processing on the third SDU to obtain a third sub-SDU, and multiplexes the third sub-SDU into the PDU.

In other words, after the third SDU on the third logical channel is multiplexed into the PDU, if the accumulated uplink bit rate of the third network slice corresponding to the third logical channel can meet a limit of the uplink maximum bit rate of the third network slice, the terminal device may multiplex the third SDU into the PDU. Otherwise, the terminal device may perform segmentation processing on the third SDU, and multiplex the obtained third sub-SDU into the PDU, to enable the accumulated uplink bit rate of the third network slice to be equal to the uplink maximum bit rate of the third network slice. That is, when allocating an uplink resource, the terminal device may not segment an SDU as much as possible, and multiplex a larger SDU segment into the PDU as much as possible during SDU segmentation, so that data transmission on a logical channel is maximized.

Case 2: In an optional embodiment, the third logical channel includes at least two logical channels, and that the terminal device allocates the remaining uplink resource based on an uplink maximum bit rate of a network slice corresponding to the third logical channel includes: The terminal device allocates the remaining uplink resource based on the uplink maximum bit rate of the network slice corresponding to the third logical channel and in descending order of priorities of the third logical channel until any one of the following conditions is met: there is no data to be transmitted on the third logical channel, the remaining uplink resource is exhausted, or an accumulated uplink bit rate of the network slice corresponding to the third logical channel reaches a limit of the uplink maximum bit rate of the network slice corresponding to the third logical channel.

For example, that the terminal device allocates the remaining uplink resource based on the uplink maximum bit rate of the network slice corresponding to the third logical channel and in descending order of priorities of the third logical channel includes: The terminal device selects a fourth logical channel from the third logical channel, where the fourth logical channel is a logical channel with a highest priority in the third logical channel. After a fourth SDU that is on the fourth logical channel and that is not multiplexed into the PDU is multiplexed into the PDU, if an accumulated uplink bit rate of a fourth network slice corresponding to the fourth logical channel is less than or equal to an uplink maximum bit rate of the fourth network slice, the terminal device multiplexes the fourth SDU into the PDU; or after a fourth SDU that is on the fourth logical channel and that is not multiplexed into the PDU is multiplexed into the PDU, if an accumulated uplink bit rate of a fourth network slice corresponding to the fourth logical channel is greater than an uplink maximum bit rate of the fourth network slice, the terminal device performs segmentation processing on the fourth SDU to obtain a fourth sub-SDU. The terminal device multiplexes the fourth sub-SDU into the PDU.

In other words, the third logical channel includes at least two logical channels, and the fourth logical channel has the highest priority. Therefore, the terminal device preferably allocates the uplink resource to the fourth logical channel. After the fourth SDU on the fourth logical channel is multiplexed into the PDU, if the accumulated uplink bit rate of the fourth network slice corresponding to the fourth logical channel can meet a limit of the uplink maximum bit rate of the fourth network slice, the terminal device may multiplex the fourth SDU into the PDU. Otherwise, the terminal device may perform segmentation processing on the fourth SDU, and multiplex the obtained fourth sub-SDU into the PDU, to enable the accumulated uplink bit rate of the fourth network slice to be equal to the uplink maximum bit rate of the fourth network slice. That is, when allocating the uplink resource, the terminal device may not segment an SDU as much as possible, and multiplex a larger SDU segment into the PDU as much as possible during SDU segmentation, so that data transmission on a logical channel is maximized.

After the terminal device allocates the uplink resource to the fourth logical channel according to the foregoing method, if there is still a remaining uplink resource, the terminal device may continue to allocate the uplink resource to a logical channel with a next priority, where the logical channel with the next priority is a logical channel that is with a priority next to that of the fourth logical channel and that is in the at least two logical channels. A specific allocation method is similar, and details are not described herein again.

It should be understood that, in a process of the second-round allocation in this embodiment of this application, the terminal device may comply with the following principles:

(1) if an entire SDU that is on a logical channel can be filled in a remaining PDU and does not reach a limit of an uplink maximum bit rate of a network slice corresponding to the logical channel, the terminal device should not segment the SDU;

(2) if the terminal device needs to segment an SDU that is on a logical channel due to a limit of an uplink maximum bit rate of a network slice, the terminal device should fill in a maximum segment as much as possible based on a size of a remaining resource and the uplink maximum bit rate of the network slice corresponding to the logical channel, that is, the terminal device should maximize data transmission; and (3) if a radio bearer or a logical channel is suspended (a quantity of tokens is less than 0), the terminal device should not transmit data that is on the logical channel corresponding to the radio bearer.

Figure 10:
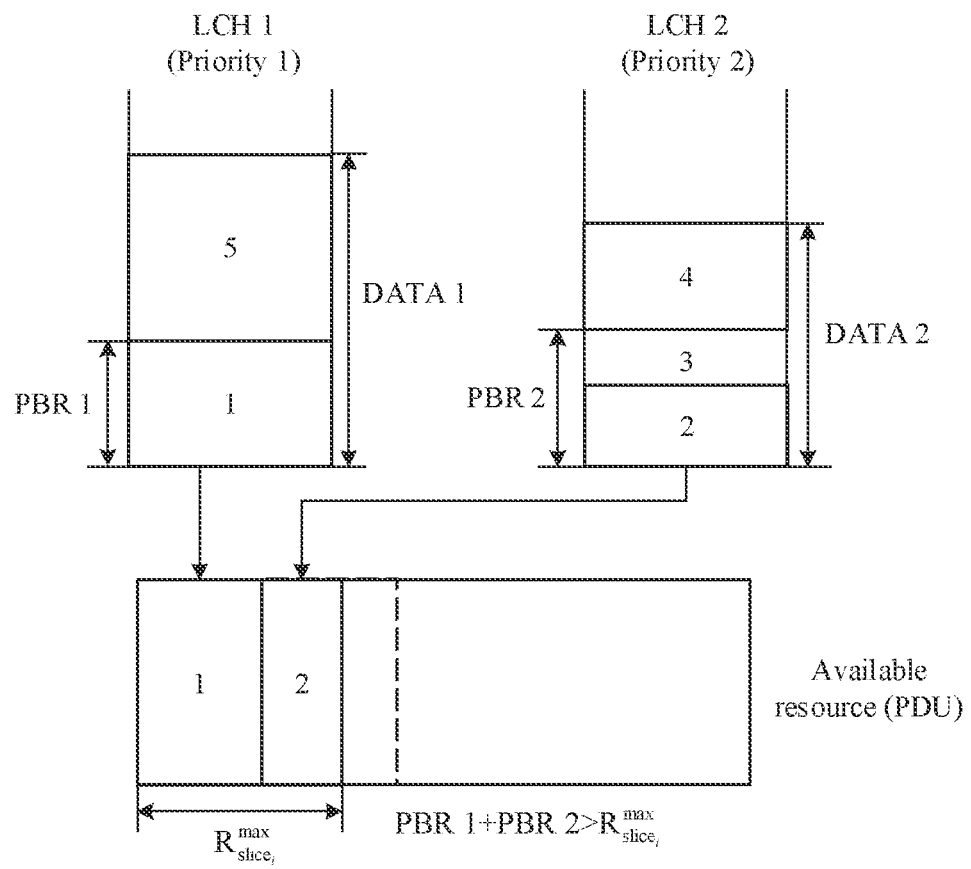
FIG. 10 is a schematic diagram of another uplink resource allocation result according to an embodiment of this application.

FIG. 10 is a schematic diagram of another uplink resource allocation result according to an embodiment of this application. In FIG. 10, there are two logical channels: an LCH 1 and an LCH 2, and the LCH 1 and the LCH 2 correspond to one network slice i. An uplink maximum bit rate of the network slice i is $R_{slice_i}^{max}$. A priority of the LCH 1 is 1, and a priority of the LCH 2 is 2. It is assumed that a smaller value indicates a higher priority, so that the LCH 1 has the highest priority, and the LCH 2 has the second highest priority. To-be-transmitted data on the LCH 1 is DATA 1, and a prioritized bit rate of the LCH 1 is a PBR 1; to-be-transmitted data on the LCH 2 is DATA 2, and a prioritized bit rate of the LCH 2 is a PBR 2.

According to the method in this embodiment of this application, the first-round allocation is first performed. To be specific, a terminal device preferably allocates an uplink resource to the LCH 1, and multiplexes an SDU 1 into a PDU, and a case in which an uplink bit rate of the LCH 1 reaches a limit of the PBR 1 occurs. Because an accumulated uplink bit rate of the network slice i does not exceed $R_{slice_i}^{max}$, the terminal device may then process the LCH 2. However, if both an SDU 2 and an SDU 3 are multiplexed into the PDU, an accumulated uplink bit rate of the network slice i is greater than $R_{slice_i}^{max}$. Therefore, the terminal device may multiplex the SDU 2 into the PDU, so that the accumulated uplink bit rate of the network slice i is equal to $R_{slice_i}^{max}$. In this case, although there is still data to be sent on both the LCH 1 and the LCH 2, and there is a remaining uplink resource, the accumulated uplink bit rate of the network slice i has reached $R_{slice_i}^{max}$, and the terminal device no longer performs the second-round allocation.

It should be understood that, FIG. 10 shows only an ideal case: After the SDU 1 (which may include one or more SDUs) is multiplexed into the PDU, the uplink bit rate of the LCH 1 is exactly equal to the PBR 1, and after the SDU 2 (which may include one or more SDUs) is multiplexed into the PDU, a sum of the uplink bit rate of the LCH 1 and an uplink bit rate of the LCH 2 is exactly equal to $R_{slice_i}^{max}$.

Figure 11:
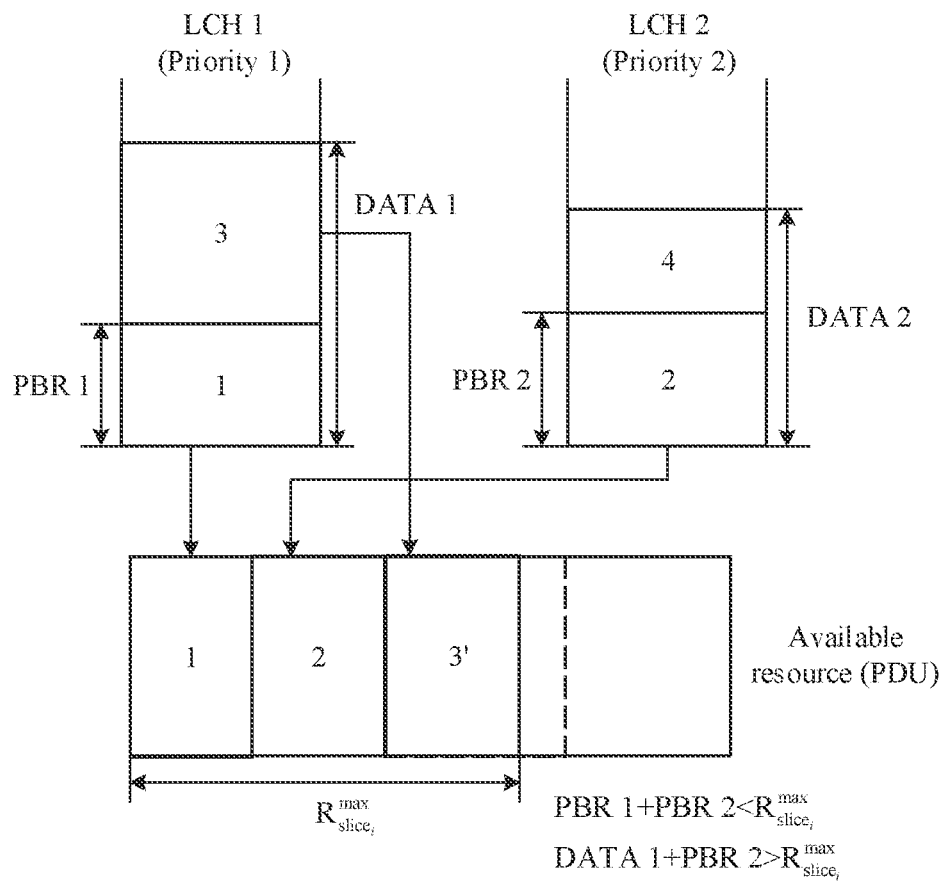
FIG. 11 is a schematic diagram of another uplink resource allocation result according to an embodiment of this application.

FIG. 11 is a schematic diagram of another uplink resource allocation result according to an embodiment of this application. In FIG. 11, there are two logical channels: an LCH 1 and an LCH 2, and the LCH 1 and the LCH 2 correspond to one network slice i. An uplink maximum bit rate of the network slice i is $R_{slice_i}^{max}$. A priority of the LCH 1 is 1, and a priority of the LCH 2 is 2. It is assumed that a smaller value indicates a higher priority, so that the LCH 1 has the highest priority, and the LCH 2 has the second highest priority. To-be-transmitted data on the LCH 1 is DATA 1, and a prioritized bit rate of the LCH 1 is a PBR 1; to-be-transmitted data on the LCH 2 is DATA 2, and a prioritized bit rate of the LCH 2 is a PBR 2.

According to the method in this embodiment of this application, the first-round allocation is first performed. To be specific, a terminal device preferably allocates an uplink resource to the LCH 1, and multiplexes an SDU 1 into a PDU, and a case in which an uplink bit rate of the LCH 1 reaches a limit of the PBR 1 occurs. Because an accumulated uplink bit rate of the network slice i does not exceed $R_{slice_i}^{max}$, the terminal device may then process the LCH 2. The terminal device multiplexes an SDU 2 into the PDU, and a case in which an uplink bit rate of the LCH 2 reaches a limit of the PBR 2 occurs. In this case, there is still data to be sent on both the LCH 1 and the LCH 2, there is a remaining uplink resource, and an accumulated uplink bit rate of the network slice i is less than $R_{slice_i}^{max}$, so that the terminal device can continue to perform the second-round allocation. Considering that if an SDU 3 is multiplexed into the PDU, an accumulated uplink bit rate of the network slice i is greater than $R_{slice_i}^{max}$, the terminal device may perform segmentation processing on the SDU 3 to obtain an SDU 3', and multiplex the SDU 3' into the PDU, so that an accumulated uplink bit rate of the network slice i is equal to $R_{slice_i}^{max}$, and the second-round allocation ends.

It should be understood that, FIG. 11 shows only an ideal case: After the SDU 1 (which may include one or more SDUs) is multiplexed into the PDU, the uplink bit rate of the LCH 1 is exactly equal to the PBR 1, and after the SDU 2 (which may include one or more SDUs) is multiplexed into the PDU, a sum of the uplink bit rate of the LCH 1 and the uplink bit rate of the LCH 2 is exactly equal to the PBR 2.

In the method 700, the terminal device ensures, based on an uplink maximum bit rate of a network slice corresponding to a logical channel, that an accumulated uplink bit rate corresponding to the network slice is less than or equal to the uplink maximum bit rate of the network slice. In other words, the terminal device needs to perform the first round of resource allocation and the second-round resource allocation for the logical channel based on the uplink maximum bit rate of the network slice. In this way, an uplink transmission rate of the terminal device in the network slice is controlled. This helps avoid a problem that the uplink transmission rate in the network slice is overloaded when the terminal device transmits uplink data, and reduces a network congestion risk.

The method 500 and the method 700 in embodiments of this application may be applied to a solution for controlling an uplink bit rate of a PDU session. For example, only the uplink maximum bit rate of the network slice in the foregoing methods needs to be replaced with an uplink maximum bit rate of the PDU session. Details are not described herein again.

It should be understood that, sequence numbers of the foregoing processes do not mean execution sequences. The execution sequences of the processes should be determined based on functions and internal logic of the processes, and should not be construed as any limitation on the implementation processes of embodiments of this application.

The uplink data transmission control method provided in embodiments of this application is described above in detail with reference to FIG. 5 to FIG. 11. An uplink data transmission control apparatus provided in embodiments of this application is described below in detail with reference to FIG. 12 to FIG. 14.

Figure 12:
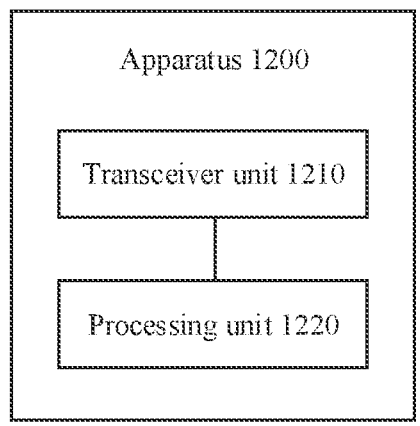
FIG. 12 is a schematic block diagram of an uplink data transmission control apparatus according to an embodiment of this application.

FIG. 12 is a schematic block diagram of an uplink data transmission control apparatus according to an embodiment of this application. As shown in FIG. 12, the apparatus 1200 may include a transceiver unit 1210 and a processing unit 1220.

In a possible design, the apparatus 1200 may correspond to the terminal device in the foregoing method embodiments. For example, the apparatus 1200 may be a terminal device, or may be a chip configured in the terminal device. The apparatus 1200 is configured to perform steps or procedures corresponding to the terminal device in the foregoing method embodiment 500.

Specifically, the transceiver unit 1210 is configured to receive first information from a network device, where the first information is used to indicate an uplink maximum bit rate of each of at least one logical channel. The processing unit 1220 is configured to allocate an uplink resource to all or a part of logical channels in the at least one logical channel based on the uplink maximum bit rate.

Optionally, the processing unit 1220 is specifically configured to allocate the uplink resource to all or the part of logical channels in the at least one logical channel based on a prioritized bit rate of the at least one logical channel and the uplink maximum bit rate.

Optionally, the processing unit 1220 is specifically configured to: allocate the uplink resource to the at least one logical channel based on the prioritized bit rate of the logical channel; if there is a remaining uplink resource, and there is still data to be transmitted on a first logical channel in the at least one logical channel, allocate the remaining uplink resource based on an uplink maximum bit rate of the first logical channel until any one of the following conditions is met: there is no data to be transmitted on the first logical channel, the remaining uplink resource is exhausted, or an uplink bit rate of the first logical channel reaches the uplink maximum bit rate of the first logical channel.

Optionally, the processing unit 1220 is specifically configured to: if a sum of an uplink bit rate of a first service data unit SDU that is on the first logical channel and that is not multiplexed into a protocol data unit PDU and an uplink bit rate of a second SDU that is on the first logical channel and that has been multiplexed into the PDU is less than or equal to the uplink maximum bit rate of the first logical channel, multiplex the first SDU into the PDU.

Optionally, the processing unit 1220 is specifically configured to: if a sum of an uplink bit rate of a first SDU that is on the first logical channel and that is not multiplexed into a PDU and an uplink bit rate of a second SDU that is on the first logical channel and that has been multiplexed into the PDU is greater than the uplink maximum bit rate of the first logical channel, perform segmentation processing on the first SDU to obtain a first sub-SDU, and multiplex the first sub-SDU into the PDU.

Optionally, the first logical channel includes at least two logical channels, and the processing unit 1220 is specifically configured to: allocate the remaining uplink resource based on uplink maximum bit rates of the at least two logical channels and in descending order of priorities of the at least two logical channels until any one of the following conditions is met: there is no data to be transmitted on the at least two logical channels, the remaining uplink resource is exhausted, or uplink bit rates of the at least two logical channels reach limits of the uplink maximum bit rates of the at least two logical channels.

Optionally, the processing unit 1220 is specifically configured to: if a sum of an uplink bit rate of a third SDU that is on a second logical channel and that is not multiplexed into a PDU and an uplink bit rate of a fourth SDU that is on the second logical channel and that has been multiplexed into the PDU is less than or equal to an uplink maximum bit rate of the second logical channel, multiplex the third SDU into the PDU, where the second logical channel is a logical channel with a highest priority in the at least two logical channels.

Optionally, the processing unit 1220 is specifically configured to: if a sum of an uplink bit rate of a third SDU that is on a second logical channel and that is not multiplexed into a PDU and an uplink bit rate of a fourth SDU that is on the second logical channel and that has been multiplexed into the PDU is greater than an uplink maximum bit rate of the second logical channel, perform segmentation processing on the third SDU to obtain a third sub-SDU, and multiplex the third sub-SDU into the PDU, where the second logical channel is a logical channel with a highest priority in the at least two logical channels.

In a possible design, the apparatus 1200 may correspond to the network device in the foregoing method embodiments. For example, the apparatus 1200 may be a network device or a chip configured in the network device. The apparatus 1200 is configured to perform steps or procedures corresponding to the network device in the foregoing method embodiment 500.

The processing unit 1220 is configured to determine first information, where the first information is used to indicate an uplink maximum bit rate of each of at least one logical channel. The transceiver unit 1210 is configured to send the first information to a terminal device.

Optionally, the transceiver unit 1210 is further configured to receive a protocol data unit PDU from the terminal device, where the PDU includes data from all or a part of logical channels in the at least one logical channel, and the data from all or the part of logical channels is multiplexed into the PDU based on the uplink maximum bit rate.

Optionally, the processing unit 1220 is configured to parse the PDU to obtain the data that is from all or the part of logical channels.

Optionally, the at least one logical channel corresponds to one network slice.

Optionally, the at least one logical channel corresponds to one PDU session.

In a possible design, the apparatus 1200 may correspond to the terminal device in the foregoing method embodiments. For example, the apparatus 1200 may be a terminal device, or may be a chip configured in the terminal device. The apparatus 1200 is configured to perform steps or procedures corresponding to the terminal device in the foregoing method embodiment 700.

Specifically, the processing unit 1220 is configured to determine a prioritized bit rate of a logical channel and an uplink maximum bit rate of a network slice, where the logical channel corresponds to the network slice. The processing unit 1220 is further configured to allocate an uplink resource to the logical channel based on the prioritized bit rate of the logical channel and the uplink maximum bit rate of the network slice.

Optionally, the processing unit 1220 is specifically configured to allocate the uplink resource to the logical channel based on the prioritized bit rate of the logical channel and the uplink maximum bit rate of the network slice until any one of the following conditions is met: an uplink bit rate of the logical channel reaches a limit of the prioritized bit rate of the logical channel, an uplink bit rate of the network slice exceeds the uplink maximum bit rate of the network slice, or the uplink resource is exhausted.

Optionally, the logical channel includes at least two logical channels, and the processing unit 1220 is specifically configured to allocate the uplink resource to the at least two logical channels in descending order of priorities of the at least two logical channels and based on prioritized bit rates of the logical channels and the uplink maximum bit rate of the network slice until any one of the following conditions is met: uplink bit rates of the at least two logical channels both reach limits of the prioritized bit rates of the at least two logical channels, an uplink bit rate of the network slice corresponding to the at least two logical channels reaches a limit of an uplink bit rate of the network slice corresponding to the at least two logical channels, or the uplink resource is exhausted.

Optionally, the processing unit 1220 is specifically configured to: when a quantity of tokens corresponding to a first logical channel in the at least two logical channels is greater than 0, after a first service data unit SDU on the first logical channel in the at least two logical channels is multiplexed to a protocol data unit PDU, if an accumulated uplink bit rate of a first network slice that is in the network slice and that corresponds to the first logical channel is less than or equal to an uplink maximum bit rate of the first network slice, multiplex the first SDU into the PDU, where the first logical channel is a logical channel with a highest priority in the at least two logical channels.

Optionally, the processing unit 1220 is specifically configured to: when a quantity of tokens corresponding to a first logical channel in the at least two logical channels is greater than 0, after a first SDU on the first logical channel in the at least two logical channels is multiplexed to a PDU, if an accumulated uplink bit rate of a first network slice that is in the network slice and that corresponds to the first logical channel is greater than an uplink maximum bit rate of the first network slice, and a quantity of tokens corresponding to a second logical channel in the at least two logical channels is greater than 0, after a second SDU on a second logical channel in the at least two logical channels is multiplexed into the PDU, if an accumulated uplink bit rate of a second network slice that is in the network slice and that corresponds to the second logical channel is less than or equal to an uplink maximum bit rate of the second network slice, multiplex the second SDU into the PDU, where the first logical channel is a logical channel with a highest priority in the at least two logical channels, and the second logical channel is a logical channel with a priority next to that of the first logical channel in the at least two logical channels.

Optionally, the accumulated uplink bit rate of the first network slice is determined based on a length of a sliding time window of the first network slice and an accumulated data amount of the first network slice in the sliding time window, where the accumulated data amount of the first network slice in the sliding time window is a sum of amounts of data transmitted on all logical channels of the first network slice in a first time period starting from a current moment, and a length of the first time period is the length of the sliding time window.

Optionally, the apparatus further includes the transceiver unit 1210, configured to receive second information sent by a network device, where the second information is used to indicate the length of the sliding time window of the first network slice.

Optionally, the processing unit 1220 is specifically configured to: after allocating the uplink resource to the logical channel based on the prioritized bit rate of the logical channel and the uplink maximum bit rate of the network slice, if there is a remaining uplink resource, and there is still data to be transmitted on a third logical channel in the logical channel, allocate the remaining uplink resource based on an uplink maximum bit rate of a network slice corresponding to the third logical channel, until any one of the following conditions is met: there is no data to be transmitted on the third logical channel, the remaining uplink resource is exhausted, or an accumulated uplink bit rate of the network slice corresponding to the third logical channel reaches a limit of the uplink maximum bit rate of the network slice corresponding to the third logical channel.

Optionally, the processing unit 1220 is specifically configured to: after a third SDU that is on the third logical channel and that is not multiplexed into the PDU is multiplexed into the PDU, if an accumulated uplink bit rate of a third network slice that is in the network slice and that corresponds to the third logical channel is less than or equal to an uplink maximum bit rate of the third network slice, multiplex the third SDU into the PDU; or after a third SDU is multiplexed into the PDU, if an accumulated uplink bit rate of a third network slice is greater than an uplink maximum bit rate of the third network slice, perform segmentation processing on the third SDU to obtain a third sub-SDU, and multiplex the third sub-SDU into the PDU.

Optionally, the third logical channel includes at least two logical channels. The processing unit 1220 is specifically configured to allocate the remaining uplink resource based on the uplink maximum bit rate of the network slice corresponding to the third logical channel and in descending order of priorities of the third logical channel until any one of the following conditions is met: there is no data to be transmitted on the third logical channel, the remaining uplink resource is exhausted, or an accumulated uplink bit rate of the network slice corresponding to the third logical channel reaches a limit of the uplink maximum bit rate of the network slice corresponding to the third logical channel.

Optionally, the processing unit 1220 is specifically configured to: after a fourth SDU that is on a fourth logical channel and that is not multiplexed into the PDU is multiplexed into the PDU, if an accumulated uplink bit rate of a fourth network slice corresponding to the fourth logical channel is less than or equal to an uplink maximum bit rate of the fourth network slice, multiplex the fourth SDU into the PDU, where the fourth logical channel is a logical channel with a highest priority in the third logical channel.

Optionally, the processing unit 1220 is specifically configured to: after a fourth SDU that is on a fourth logical channel and that is not multiplexed into the PDU is multiplexed into the PDU, if an accumulated uplink bit rate of a fourth network slice corresponding to the fourth logical channel is greater than an uplink maximum bit rate of the fourth network slice, perform segmentation processing on the fourth SDU to obtain a fourth sub-SDU, and multiplex the fourth sub-SDU into the PDU, where the fourth logical channel is a logical channel with a highest priority in the third logical channel.

In a possible design, the apparatus 1200 may correspond to the network device in the foregoing method embodiments. For example, the apparatus 1200 may be a network device or a chip configured in the network device. The apparatus 1200 is configured to perform steps or procedures corresponding to the network device in the foregoing method embodiment 700.

The transceiver unit 1210 is configured to receive a protocol data unit PDU from a terminal device, where the PDU includes data from a logical channel, the logical channel corresponds to a network slice, and the data that is from the logical channel is multiplexed into the PDU based on a prioritized bit rate of the logical channel and an uplink maximum bit rate of the network slice. The processing unit 1220 is configured to parse the PDU to obtain the data that is from the logical channel.

Optionally, the processing unit 1220 is further configured to: before the network device receives the protocol data unit PDU from the terminal device, determine a length of a sliding time window of the network slice. The transceiver unit 1210 is further configured to send second information to the terminal device, where the second information is used to indicate the length of the sliding time window of the network slice.

Optionally, the second information includes an identifier of the network slice and the length of the sliding time window of the network slice, and the length of the sliding time window of the network slice corresponds to the identifier of the network slice.

Optionally, the processing unit 1220 is specifically configured to determine the length of the sliding time window of the network slice based on a type of the network slice.

It should be understood that, the apparatus 1200 herein is presented in a form of functional units. The term "unit" herein may refer to an application-specific integrated circuit (application-specific integrated circuit, ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the apparatus 1200 may be specifically the terminal device in the foregoing embodiments, and may be configured to perform procedures and/or steps corresponding to the terminal device in the foregoing method embodiments, or the apparatus 1200 may be specifically the network device in the foregoing embodiments, and may be configured to perform procedures and/or steps corresponding to the network device in the foregoing method embodiments. To avoid repetition, details are not described herein again.

The apparatus 1200 in each of the foregoing solutions has a function of implementing corresponding steps performed by the terminal device in the foregoing methods, or the apparatus 1200 in each of the foregoing solutions has a function of implementing corresponding steps performed by the network device in the foregoing methods. The function may be implemented by hardware, or may be implemented by hardware executing corresponding software. The hardware or software includes one or more modules corresponding to the foregoing function. For example, a communication unit may be replaced with a transceiver (where for example, a sending unit in the communication unit may be replaced with a transmitter, and a receiving unit in the communication unit may be replaced with a receiver), and another unit such as a processing unit may be replaced with a processor, to separately perform receiving and sending operations and a related processing operation in the method embodiments.

In addition, the communication unit may alternatively be a transceiver circuit (where for example, the transceiver circuit may include a receiver circuit and a transmitter circuit), and the processing unit may be a processing circuit. In this embodiment of this application, the apparatus in FIG. 12 may be the terminal device or the network device in the foregoing embodiments, or may be a chip or a chip system, for example, a system-on-a-chip (system-on-a-chip, SoC). The communication unit may be an input/output circuit or a communication interface. The processing unit is a processor, a microprocessor, or an integrated circuit integrated on the chip. This is not limited herein.

Figure 13:
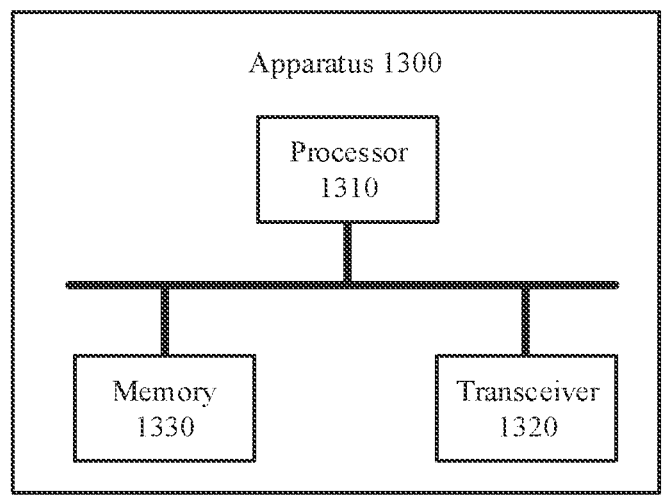
FIG. 13 is a schematic block diagram of another uplink data transmission control apparatus according to an embodiment of this application.

FIG. 13 shows an uplink data transmission control apparatus 1300 according to an embodiment of this application. The apparatus 1300 includes a processor 1310 and a transceiver 1320. The processor 1310 and the transceiver 1320 communicate with each other through an internal connection path, and the processor 1310 is configured to execute instructions, to control the transceiver 1320 to send a signal and/or receive a signal.

Optionally, the apparatus 1300 may further include a memory 1330. The memory 1330 communicates with the processor 1310 and the transceiver 1320 through an internal connection path. The memory 1330 is configured to store instructions, and the processor 1310 may execute the instructions stored in the memory 1330. In a possible implementation, the apparatus 1300 is configured to implement procedures and steps corresponding to a transmit end in the foregoing method embodiments. In another possible implementation, the apparatus 1300 is configured to implement procedures and steps corresponding to a receive end in the foregoing method embodiments.

It should be understood that, the apparatus 1300 may be specifically the terminal device or the network device in the foregoing embodiments, or may be a chip or a chip system. Correspondingly, the transceiver 1320 may be a transceiver circuit of the chip. This is not limited herein. Specifically, the apparatus 1300 may be configured to perform steps and/or procedures corresponding to the terminal device or the network device in the foregoing method embodiments. Optionally, the memory 1330 includes a read-only memory and a random access memory, and provide instructions and data for the processor. A part of the memory may further include a non-volatile random access memory. For example, the memory may further store information about a device type. The processor 1310 may be configured to execute the instructions stored in the memory. In addition, when the processor 1310 executes the instructions stored in the memory, the processor 1310 is configured to perform the steps and/or the procedures corresponding to the terminal device or the network device in the foregoing method embodiments.

Figure 14:
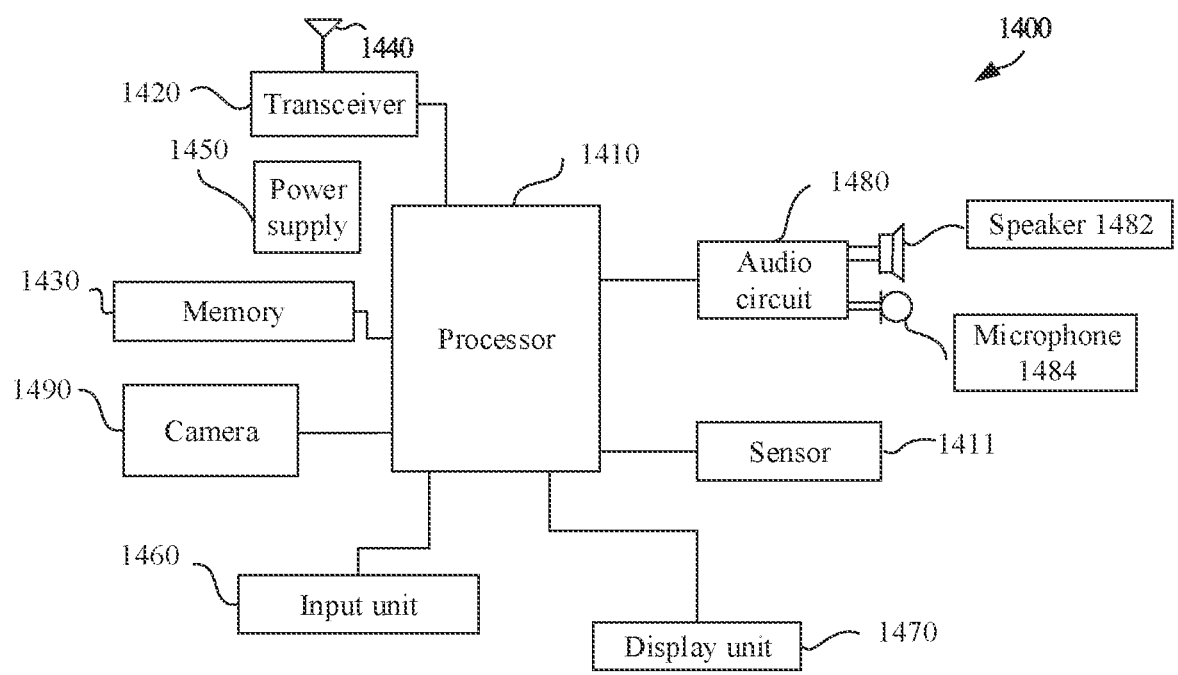
FIG. 14 is a schematic diagram of a structure of a terminal device according to an embodiment of this application.

FIG. 14 is a schematic diagram of a structure of a terminal device 1400 according to an embodiment of this application. The terminal device 1400 may be used in the system shown in FIG. 1, and perform the functions of the terminal device in the foregoing method embodiments. As shown in the figure, the terminal device 1400 includes a processor 1410 and a transceiver 1420. Optionally, the terminal device 1400 further includes a memory 1430. The processor 1410, the transceiver 1420, and the memory 1430 communicate with each other through an internal connection path, to transfer a control signal and/or a data signal. The memory 1430 is configured to store a computer program. The processor 1410 is configured to invoke the computer program from the memory 1430 and run the computer program, to control the transceiver 1420 to receive/send a signal. Optionally, the terminal device 1400 may further include an antenna 1440 that is configured to send, by using a radio signal, uplink data or uplink control signaling output by the transceiver 1420.

The processor 1410 and the memory 1430 may be integrated into one processing apparatus. The processor 1410 is configured to execute program code stored in the memory 1430, to implement the foregoing functions. During specific implementation, the memory 1430 may also be integrated into the processor 1410, or may be independent of the processor 1410. The processor 1410 may correspond to the processing unit in FIG. 12.

The transceiver 1420 may correspond to the transceiver unit in FIG. 12, and may also be referred to as a transceiver unit. The transceiver 1420 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that, the terminal device 1400 shown in FIG. 14 can implement processes related to the terminal device in the method embodiments. The operations and/or the functions of the modules in the terminal device 1400 are intended to implement corresponding procedures in the foregoing method embodiments. For details, refer to the descriptions in the foregoing method embodiments. To avoid repetition, detailed descriptions are properly omitted herein.

The processor 1410 may be configured to perform an action that is implemented inside the terminal device and that is described in the foregoing method embodiments. The transceiver 1420 may be configured to perform an action that is of sending information by the terminal device to the network device or receiving information by the terminal device from the network device and that is described in the foregoing method embodiments. For details, refer to the descriptions in the foregoing method embodiments. Details are not described herein again.

Optionally, the terminal device 1400 may further include a power supply 1450, configured to supply power to various devices or circuits in the terminal device.

In addition, to implement more complete functions of the terminal device, the terminal device 1400 may further include one or more of an input unit 1460, a display unit 1470, an audio circuit 1480, a camera 1490, a sensor 1411, and the like, and the audio circuit may further include a speaker 1482, a microphone 1484, and the like.

An embodiment of this application further provides a processing apparatus, including a processor and an interface. The processor is configured to perform the method in any one of the foregoing method embodiments.

It should be understood that, the processing apparatus may be a chip. For example, the processing apparatus may be a field programmable gate array (field programmable gate array, FPGA), an application-specific integrated chip (application-specific integrated circuit, ASIC), a system-on-a-chip (system-on-a-chip, SoC), a central processing unit (central processor unit, CPU), a network processor (network processor, NP), a digital signal processor (digital signal processor, DSP), a microcontroller unit (microcontroller unit, MCU), a programmable logic device (programmable logic device, PLD), or another integrated chip.

In an implementation process, the steps in the foregoing methods may be implemented by using a hardware integrated logic circuit in the processor or by using instructions in a form of software. The steps of the methods disclosed with reference to embodiments of this application may be directly performed and completed by a hardware processor, or may be performed and completed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware in the processor. To avoid repetition, details are not described herein again.

It should be noted that the processor in embodiments of this application may be an integrated circuit chip, and has a signal processing capability. In an implementation process, steps in the foregoing method embodiments may be implemented by using a hardware integrated logic circuit in the processor or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware in the processor.

It may be understood that, in embodiments of this application, the memory may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memories in the system and methods described in this specification include but are not limited to these memories and any memory of another suitable type.

According to the method provided in embodiments of this application, this application further provides a computer program product. The computer program product includes computer program code. When the computer program code is run on a computer, the computer is enabled to perform the steps or procedures performed by the terminal device or the network device in embodiments shown in FIG. 5 to FIG. 11.

According to the method provided in embodiments of this application, this application further provides a computer-readable storage medium. The computer-readable storage medium stores program code. When the program code is run on a computer, the computer is enabled to perform the steps or procedures performed by the terminal device or the network device in embodiments shown in FIG. 5 to FIG. 11.

According to the method provided in embodiments of this application, this application further provides a communication system, including the foregoing one or more terminal devices and one or more network devices.

The network device and the terminal device in the foregoing apparatus embodiments entirely correspond to the network device or the terminal device in the method embodiments, and a corresponding module or unit performs a corresponding step. For example, a communication unit (a transceiver) performs a receiving step or a sending step in the method embodiments, and a processing unit (a processor) may perform steps other than the sending step or the receiving step. A function of a specific unit may be based on a corresponding method embodiment. There may be one or more processors.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As illustrated by using the figures, both a computing device and an application that runs on the computing device may be components. One or more components may reside within a process and/or a thread of execution, and a component may be located on one computer and/or distributed between two or more computers. In addition, these components may be executed from various computer-readable storage media that store various data structures. The components may communicate by using a local and/or remote process and based on, for example, a signal having one or more data packets (for example, data from two components interacting with another component in a local system, a distributed system, and/or across a network such as the internet interacting with other systems by using the signal).

It should be understood that, in this specification, "at least one" means one or more, and "a plurality of" means two or more. The term "and/or" describes an association relationship for describing associated objects and represents that three relationships may exist. For example, A and/or B may indicate the following cases: A exists alone, both A and B exist, and B exists alone, where A and B may be singular or plural. The character "/" generally indicates an "or" relationship between associated objects. "At least one of the following" or a similar expression thereof refers to any combination of these items, including any combination of a single item (piece) or a plurality of items (pieces). For example, at least one of a, b, and c may indicate a, b, c, a and b, a and c, b and c, or a, b, and c, where a, b, or c may be singular or plural.

A person of ordinary skill in the art may be aware that, various illustrative logical blocks (illustrative logical blocks) and steps (steps) that are described with reference to embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatuses, and units, refer to a corresponding process in the foregoing method embodiments, and details are not described herein again.

In the several embodiments provided in this application, it should be understood that, the disclosed system, apparatuses, and methods may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions in embodiments.

In addition, functional units in embodiments of this application may be integrated into one processing unit, or each of the units may exist alone physically, or two or more units may be integrated into one unit.

In the foregoing embodiments, all or some of the functions of the function units may be implemented by software, hardware, firmware, or any combination thereof. When software is used to implement embodiments, all or some of embodiments may be implemented in a form of a computer program product. The computer program product includes one or more computer instructions (programs). When the computer program instructions (programs) are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

When the functions are implemented in the form of a software functional unit and sold or used as an independent product, the functions may be stored in a computer-readable storage medium. Based on such an understanding, the technical solutions of this application essentially, or the part contributing to a conventional technology, or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An uplink data transmission control method, comprising:
   receiving, by a terminal device, first information from a network device, wherein the first information indicates an uplink maximum bit rate of each of at least one logical channel; and
   allocating, by the terminal device, an uplink resource to one or more logical channels in the at least one logical channel based on the uplink maximum bit rate, wherein the at least one logical channel comprises a first logical channel, wherein a first service data unit (SDU) is on the first logical channel and is not multiplexed into a protocol data unit (PDU), wherein a second SDU is on the first logical channel and has been multiplexed into the PDU, and wherein the allocating comprises:
      if a sum of an uplink bit rate of the first SDU and an uplink bit rate of the second SDU is greater than an uplink maximum bit rate of the first logical channel:
         performing, by the terminal device, segmentation processing on the first SDU to obtain a first sub-SDU; and
         multiplexing, by the terminal device, the first sub-SDU into the PDU.

2. The method according to claim 1, wherein the allocating, by the terminal device, an uplink resource to one or more logical channels in the at least one logical channel based on the uplink maximum bit rate comprises:
    allocating, by the terminal device, the uplink resource to the one or more logical channels based on a prioritized bit rate of the at least one logical channel and the uplink maximum bit rate.

3. The method according to claim 2, wherein the allocating, by the terminal device, the uplink resource to the one or more logical channels based on a prioritized bit rate of the at least one logical channel and the uplink maximum bit rate comprises:
    allocating, by the terminal device, the uplink resource to the at least one logical channel based on the prioritized bit rate; and
    if (i) there is a remaining uplink resource and (ii) there is still data to be transmitted on the first logical channel, allocating, by the terminal device, the remaining uplink resource based on the uplink maximum bit rate of the first logical channel until any one of the following conditions is met:
    there is no data to be transmitted on the first logical channel, the remaining uplink resource is exhausted, or an uplink bit rate of the first logical channel reaches a limit of the uplink maximum bit rate of the first logical channel.

4. The method according to claim 3, wherein the allocating, by the terminal device, the remaining uplink resource based on an uplink maximum bit rate of the first logical channel comprises:
    if the sum of the uplink bit rate of the first SDU and the uplink bit rate of the second SDU is less than or equal to the uplink maximum bit rate of the first logical channel, multiplexing, by the terminal device, the first SDU into the PDU.

5. The method according to claim 3, wherein the first logical channel comprises at least two logical channels, and wherein the allocating, by the terminal device, the remaining uplink resource based on the uplink maximum bit rate of the first logical channel comprises:
    allocating, by the terminal device, the remaining uplink resource based on uplink maximum bit rates of the at least two logical channels and in descending order of priorities of the at least two logical channels until any one of the following conditions is met:
    there is no data to be transmitted on the at least two logical channels, the remaining uplink resource is exhausted, or uplink bit rates of the at least two logical channels both reach limits of the uplink maximum bit rates of the at least two logical channels.

6. The method according to claim 5, wherein the allocating, by the terminal device, the remaining uplink resource based on uplink maximum bit rates of the at least two logical channels and in descending order of priorities of the at least two logical channels comprises:
    if a sum of an uplink bit rate of a third SDU that is on a second logical channel and that is not multiplexed into an additional PDU and an uplink bit rate of a fourth SDU that is on the second logical channel and that has been multiplexed into the additional PDU is less than or equal to an uplink maximum bit rate of the second logical channel, multiplexing, by the terminal device, the third SDU into the PDU, wherein the second logical channel has a highest priority in the at least two logical channels.

7. The method according to claim 5, wherein the allocating, by the terminal device, the remaining uplink resource based on uplink maximum bit rates of the at least two logical channels and in descending order of priorities of the at least two logical channels comprises:
    if a sum of an uplink bit rate of a third SDU that is on a second logical channel and that is not multiplexed into an additional PDU and an uplink bit rate of a fourth SDU that is on the second logical channel and that has been multiplexed into the additional PDU is greater than an uplink maximum bit rate of the second logical channel, performing, by the terminal device, segmentation processing on the third SDU to obtain a third sub-SDU, and multiplexing the third sub-SDU into the PDU, wherein the second logical channel has a highest priority in the at least two logical channels.

8. The method according to claim 1, wherein the at least one logical channel corresponds to one network slice.

9. An uplink data transmission control method, comprising:
    determining, by a network device, first information, wherein the first information indicates an uplink maximum bit rate of each of at least one logical channel; and
    sending, by the network device, the first information to a terminal device, wherein the at least one logical channel comprises a first logical channel, wherein a first service data unit (SDU) is on the first logical channel and is not multiplexed into a protocol data unit (PDU), wherein a second SDU is on the first logical channel and has been multiplexed into the PDU, and wherein if a sum of an uplink bit rate of the first SDU and an uplink bit rate of the second SDU is greater than an uplink maximum bit rate of the first logical channel, segmentation processing is performed on the first SDU to obtain a first sub-SDU, and the first sub-SDU is multiplexed into the PDU.

10. An uplink data transmission control apparatus, comprising:
    at least one processor, wherein the at least one processor is coupled to at least one memory storing programming instructions executable by the at least one processor to perform operations comprising:
        receiving first information from a network device, wherein the first information indicates an uplink maximum bit rate of each of at least one logical channel; and
        allocating an uplink resource to one or more logical channels in the at least one logical channel based on the uplink maximum bit rate, wherein the at least one logical channel comprises a first logical channel, wherein a first service data unit (SDU) is on the first logical channel and is not multiplexed into a protocol data unit (PDU), wherein a second SDU is on the first logical channel and has been multiplexed into the PDU, and wherein the allocating comprises:
            if a sum of an uplink bit rate of the first SDU and an uplink bit rate of the second SDU is greater than an uplink maximum bit rate of the first logical channel:
                performing segmentation processing on the first SDU to obtain a first sub-SDU; and
                multiplexing the first sub-SDU into the PDU.

11. The apparatus according to claim 10, wherein the operations further comprise:
    allocating the uplink resource to the one or more logical channels based on a prioritized bit rate of the at least one logical channel and the uplink maximum bit rate.

12. The apparatus according to claim 10, wherein the operations further comprise:

if (i) there is a remaining uplink resource and (ii) there is still data to be transmitted on the first logical channel, allocating the remaining uplink resource based on the uplink maximum bit rate of the first logical channel until any one of the following conditions is met:

there is no data to be transmitted on the first logical channel, the remaining uplink resource is exhausted, or an uplink bit rate of the first logical channel reaches a limit of the uplink maximum bit rate of the first logical channel.

13. The apparatus according to claim 12, wherein the operations further comprise:
if the sum of the uplink bit rate of the first SDU and the uplink bit rate of the second SDU is less than or equal to the uplink maximum bit rate of the first logical channel, multiplexing the first SDU into the PDU.

14. The apparatus according to claim 12, wherein the first logical channel comprises at least two logical channels, wherein the operations further comprise:
allocating the remaining uplink resource based on uplink maximum bit rates of the at least two logical channels and in descending order of priorities of the at least two logical channels until any one of the following conditions is met:
there is no data to be transmitted on the at least two logical channels, the remaining uplink resource is exhausted, or uplink bit rates of the at least two logical channels both reach limits of the uplink maximum bit rates of the at least two logical channels.

15. The apparatus according to claim 14, wherein the operations further comprise:
if a sum of an uplink bit rate of a third SDU that is on a second logical channel and that is not multiplexed into an additional PDU and an uplink bit rate of a fourth SDU that is on the second logical channel and that has been multiplexed into the additional PDU is less than or equal to an uplink maximum bit rate of the second logical channel, multiplexing the third SDU into the PDU, wherein the second logical channel has a highest priority in the at least two logical channels.

16. The apparatus according to claim 14, wherein the operations further comprise:
if a sum of an uplink bit rate of a third SDU that is on a second logical channel and that is not multiplexed into an additional PDU and an uplink bit rate of a fourth SDU that is on the second logical channel and that has been multiplexed into the additional PDU is greater than an uplink maximum bit rate of the second logical channel, performing segmentation processing on the third SDU to obtain a third sub-SDU, and multiplex the third sub-SDU into the PDU, wherein the second logical channel has a highest priority in the at least two logical channels.

17. An uplink data transmission control apparatus, comprising:
at least one processor, wherein the at least one processor is coupled to at least one memory storing programming instructions executable by the at least one processor to perform operations comprising:
determining first information, wherein the first information indicates an uplink maximum bit rate of each of at least one logical channel; and
sending the first information to a terminal device, wherein the at least one logical channel comprises a first logical channel, wherein a first service data unit (SDU) is on the first logical channel and is not multiplexed into a protocol data unit (PDU), wherein a second SDU is on the first logical channel and has been multiplexed into the PDU, and wherein if a sum of an uplink bit rate of the first SDU and an uplink bit rate of the second SDU is greater than an uplink maximum bit rate of the first logical channel, segmentation processing is performed on the first SDU to obtain a first sub-SDU, and the first sub-SDU is multiplexed into the PDU.

18. The apparatus according to claim 17, wherein the operations further comprise:
receiving the PDU from the terminal device, wherein the PDU comprises data from one or more logical channels in the at least one logical channel, and the data from the one or more logical channels is multiplexed into the PDU based on the uplink maximum bit rate.

\* \* \* \* \*